(12) United States Patent
Gleason

(10) Patent No.: US 10,569,978 B2
(45) Date of Patent: Feb. 25, 2020

(54) TRAILER RESTRAINT WITH AUXILIARY SECURING/LOCKING MECHANISM

(71) Applicant: Denis Gleason, Bowmanville (CA)

(72) Inventor: Denis Gleason, Bowmanville (CA)

(73) Assignee: Nordock, Inc., Bowmanville, Ontario (CA)

( * ) Notice: Subject to any disclaimer, the term of this patent is extended or adjusted under 35 U.S.C. 154(b) by 0 days.

(21) Appl. No.: 15/965,783

(22) Filed: Apr. 27, 2018

(65) Prior Publication Data

US 2019/0329993 A1 Oct. 31, 2019

(51) Int. Cl.
*B65G 69/00* (2006.01)

(52) U.S. Cl.
CPC .................. *B65G 69/003* (2013.01)

(58) Field of Classification Search
CPC .................................... B65G 69/003
USPC ......................................... 414/401
See application file for complete search history.

(56) References Cited

U.S. PATENT DOCUMENTS

| | | |
|---|---|---|
| 4,264,259 A | 4/1981 | Hipp |
| 4,472,099 A | 9/1984 | Hahn |
| 4,488,325 A | 12/1984 | Bennett |
| 4,560,315 A | 12/1985 | Hahn |
| 4,887,954 A | 12/1989 | Gregerson |
| 4,938,648 A | 7/1990 | Horan |
| 4,964,777 A | 10/1990 | Kleynjans |
| 5,096,359 A | 3/1992 | Alexander |
| 6,113,337 A | 9/2000 | Massey |
| 6,162,005 A | 12/2000 | Fritz |
| 6,190,109 B1 | 2/2001 | Bender |
| 7,384,229 B2 | 6/2008 | Gleason |
| 8,596,949 B2 | 12/2013 | Harrington |
| 9,145,273 B2 | 9/2015 | Brooks |
| 9,174,811 B2 | 11/2015 | Proffitt |
| 9,272,854 B2 * | 3/2016 | Lessard .................. B65G 69/28 |
| 9,428,349 B2 | 8/2016 | Muhl |
| 9,586,771 B2 | 3/2017 | Brooks |
| 2008/0095598 A1 * | 4/2008 | Cotton .................. B65G 69/003 414/401 |
| 2013/0017044 A1 * | 1/2013 | Brooks ................ B65G 69/003 414/401 |
| 2013/0017045 A1 * | 1/2013 | Brooks ................ B65G 69/003 414/401 |
| 2014/0064891 A1 * | 3/2014 | Brooks ................ B65G 69/003 414/401 |

(Continued)

*Primary Examiner* — Kaitlin S Joerger
(74) *Attorney, Agent, or Firm* — Jeffrey S. Sokol

(57) ABSTRACT

The present invention is an impact vehicle restraint with a hook and auxiliary securing/locking mechanism that combine to secure the RIG bar of a trailer to a loading dock. A motor rotates the hook between retracted and extended positions. When extended, the hook secures and holds the RIG bar to the dock. When the hook is extended, the auxiliary securing/locking mechanism is also extended to and held at a set position by a biasing mechanism. When the hook is blocked by an obstruction, forward movement of the trailer causes the RIG bar and the obstruction to slide into engagement with the auxiliary securing/locking mechanism, which accepts the RIG bar and obstruction and moves to a locked position to secure the RIG bar. The retraction of the hook by the motor overpowers the biasing mechanism and causes the retraction of the auxiliary securing/locking mechanism.

29 Claims, 15 Drawing Sheets

(56) References Cited

U.S. PATENT DOCUMENTS

2014/0064892 A1* 3/2014 Proffitt ................ B65G 69/003
  414/401
2017/0066607 A1* 3/2017 Muhl ................... B65G 69/003
2017/0144847 A1   5/2017 Gadbois

* cited by examiner

TRAILER RESTRAINT WITH AUXILIARY SECURING/LOCKING MECHANISM

FIELD OF THE INVENTION

The invention pertains to an impact vehicle restraint with a hook and auxiliary locking mechanism to engage and hold a trailer to a loading dock during the loading and unloading of the trailer.

BACKGROUND OF THE INVENTION

Vehicle restraints are utilized to increase safety at a loading dock. The restraints secure a truck trailer to the loading dock structure or building when goods are transferred between the trailer and the building. The restraints typically engage a rear horizontal bar referred to as the rear impact guard (RIG) or ICC bar. The RIG or ICC bar is located at the rear end of the trailer below the trailer bed. When the trailer is backed up to an available loading dock stall, the RIG bar is positioned close to the face wall of the dock. Bumpers typically extend from the face wall to protect the trailer, dock and any dock leveling fixture at the dock. Trailer restraints typically include a hooking device located in front of the dock and anchored to the dock or ground. When in use, the hooking device forms a barrier in front of the RIG bar to secure the trailer so that it cannot move away from the dock. The restraint helps avoid accidents by securing the trailer to the loading dock so that the truck driver does not inadvertently pull the trailer away when the trailer is being loaded or unloaded. The restraint also helps prevent the trailer from being pushed away from the dock during the process of loading and unloading the trailer. For example, a fork lift, particularly one carrying heavy cargo that rides onto the trailer and abruptly stops, tends to move the trailer away from the dock.

Conventional trailer restraints include storable restraints and impact restraints. Storable restraints move between a raised operating position and a lower stored position. When in the stored position, a trailer should clear the device as it is being backed into an available loading dock stall. Conventional storable restraints are disclosed in U.S. Pat. Nos. 4,488,325, 5,096,359, 4,964,777 and 7,384,229. When the trailer and dock leveler are properly positioned with the lip of the leveler resting on the trailer bed, the stored restraint is activated to rise up and securely engage the RIG bar. Restraint mechanisms of this style are powered into their raised position by motors, springs or other mechanical means. Impact restraints include a movable carriage that adjusts to the height of the trailer RIG bar. The incoming RIG engages a sloped portion of a carriage, which pushes the carriage down and into aligned engagement with the RIG as disclosed in U.S. Pat. Nos. 4,264,259, 4,560,315, 6,162,005 and 8,596,949 the contents of which are incorporated herein. The carriage has a drive system with a motor that rotates a hook from a release position to a securing or locking position as shown in FIG. 1A. An operator actuates the motor when the RIG engages and aligns over the carriage. The motor rotates the hook so that it emerges from the carriage and securely engages the RIG bar.

A problem with impact trailer restraints is that the hook can be forced down and out of engagement with the RIG bar by certain movements of the trailer during the process of loading and unloading the trailer. The restraints or their hook drive systems do not adequately accommodate the up and down, back and forth (i.e., trailer rocks toward and away from dock "dock-walk" and vibrational movements of the RIG during the loading and unloading process, such as when forklifts move heavy cargo on and off the trailer. This can result in the hook inadvertently "walking-off" or disengaging the RIG bar, and the RIG bar from "walking-off" or disengaging from the restraint during use. While a limited amount of "dock-walk" is typically not problematic, it is when the amount is sufficient to cause the hook to disengage the RIG bar, and putting the safety of the workers at risk.

Another problem with impact trailer restraints is that trailer RIG bar is frequently obstructed so that the hook cannot grip the upper corner of the RIG bar. As shown in FIG. 1B, an obstruction such as a plate spanning the length of the RIG bar prevents the top or grip disc of the hook from wrapping around the upper forward corner of the RIG bar. Instead, the top of the hook engages the forward surface of the obstruction, which is often a smooth or otherwise generally flat surface. This accentuates the problems posed by an inadvertent pull-away by the truck driver or "dock-walk" because there is no upper corner for the hook to grip and the hook can only engage the generally flat, smooth surface of the obstruction or the flat, smooth front surface of the RIG bar as in FIG. 1C. Thus, the hook can rotate down so that its tip move down and out of engagement with the RIG bar as shown in FIG. 1D.

A further problem with trailer restraints is the large loads they are designed to withstand. Trailer restraints are often rated to withstand 100,000 pounds of trailer pull away force. Restraints with load bearing components that are not robustly and reliably designed to withstand these forces will be damaged and require replacement or expensive servicing.

A still further problem with trailer restraints is the variety of trailer heights and RIG locations. RIG bars vary vertically from the ground and horizontally from the rear end of the trailer. The height of the rear end of the trailer and RIG bar from the ground can vary widely at a loading dock, particularly when the entrance to the loading bay is sloped and the rear end of the trailer extends significantly from rear axle of the trailer. The larger the carriage and restraint components, the more limited the restraint is in accommodating a variety heights of the trailer rear end and RIG bar. Yet, the usefulness of a restraint is reduced if it does not accommodate a wide variety of trailer and RIG designs.

A still further problem with trailer restraints is the limited space the restraint can occupy during operation and when being stored during periods of non-use. For loading bays equipped with a mechanical or hydraulic dock leveler, the restraint should be located below the pit floor so that it does not obstruct the operation of a dock leveler in the pit.

A still further problem with trailer restraints is that they are susceptible to wear and tear that can increase maintenance costs and produce unsafe conditions during use. Restraints are subject to harsh working environments. They are mounted outside where dirt, debris, snow, ice, rain, humidity and temperature all contribute to the wear and tear on the device. Elaborate and intricate mechanisms are prone to wear and binding. They require frequent servicing to ensure they function properly. For example, restraints can be damaged when the RIG bar impacts a bound or frozen carriage and attempts to force it down. When these mechanisms are not properly services, the hook is not held in place and they are susceptible to allowing the hook to inadvertently drop down and out of engagement with the RIG during use, and putting the safety of the workers at risk.

The present invention is intended to solve these and other problems.

SUMMARY OF THE INVENTION

The present invention relates to an impact vehicle restraint with a hook and auxiliary locking mechanism that combine to secure the RIG bar of a trailer to a loading dock. A motor rotates the hook between retracted and extended positions. When extended, the hook secures and holds the RIG bar to the dock. When the hook is extended, the auxiliary locking mechanism is also extended to and held at a set position by a biasing mechanism. When the hook is blocked by an obstruction, forward movement of the trailer causes the RIG bar and the obstruction to slide into engagement with the auxiliary locking mechanism, which accepts the RIG bar and obstruction and moves to a locked position to secure the RIG bar. The retraction of the hook by the motor overpowers the biasing mechanism and causes the retraction of the auxiliary locking mechanism.

An advantage of the present impact trailer restraint is that the hook remains engaged to the RIG bar during use. The trailer restraint includes an auxiliary locking mechanism that prevents the hook from rotating out of engagement with the RIG bar during the loading and unloading process. The hook and auxiliary locking mechanism combine so that an inadvertent departure by a driver or the up and down, back and forth trailer movements ("dock-walk") during the loading and unloading process do not cause inadvertent disengagement of the restraint from the RIG bar.

Another advantage of the impact trailer restraint is its versatility. The trailer restraint not only captures a wide variety of RIG bars by wrapping around the top front corner of the RIG bar to better grip the RIG bar, it also captures RIG bars with obstructions preventing the hook from wrapping around its top front corner. The hook combines with the auxiliary locking mechanism to engage and capture the RIG bar and its obstruction. During an inadvertent pull-out by a driver or should the hook begin to "walk down" the obstructed RIG bar, the auxiliary locking mechanism engages the lower front corner of the RIG bar or its obstruction to stop the downward progression of the hook. The hook remains engaged with the RIG bar to prevent the hook from "walking-off" the RIG bar, the RIG bar from "walking-off" the trailer restraint, and an inadvertent and unsafe departure of the trailer from the loading bay.

A further advantage of the present trailer restraint is its power and reliability. The restraint overcomes the power of a truck should the driver inadvertently attempt to pull the trailer away from the dock, even when a RIG bar obstruction prevents the hook from gripping the top surface of the RIG bar. The restraint and its combined hook and auxiliary locking mechanisms are designed to withstand 100,000 pounds of trailer pull away force. The present trailer restraint not only prevents excessive "dock-walk" from disengaging the hook from the RIG bar, it also prevent inadvertent trail pull-away when the hook is still engaging the RIG bar or an obstruction. Thus, the restraint reliably improves the dock working environment posed by these safety risks.

A further advantage of the present trailer restraint is its user friendly nature. In most loading and unloading situations, the auxiliary locking mechanism is not needed. The driver does not attempt to drive away from the dock when the hook is engaged, and a RIG bar obstruction does not result in excessive "dock walk." In these situations, the RIG bar or an obstruction do not engage the auxiliary locking mechanism. When the auxiliary locking mechanism is not engaged, the trailer does not need to be backed up to release the locking mechanism. The hook and locking mechanisms can be lowered to their retracted positions without the need of the extra backing up step by the truck driver, which improves the overall efficiency in using the trailer restraint while ensuring dock safety.

A still further advantage of the present impact trailer restraint is the passive design of the auxiliary locking mechanism. The auxiliary locking mechanism does not require an independent motor or drive system. A spring biasing mechanism is used to deploy the auxiliary locking mechanism. The movement of the hook allows for the activation and deactivation of the biasing mechanism to keep the hook and auxiliary locking mechanism engaged with the RIG during use.

A still further advantage of the present trailer restraint is its compact nature. The restraint is located below the limited space between the pit floor and the ground in front of the dock. The restraint does not obstruct the operation of a dock leveler inside the pit. The auxiliary locking mechanism is held within the restraint housing, and little or no additional space is required. The restraint and its auxiliary locking mechanism do not require a large carriage or restraint components, so it accommodate a wide variety of trailer and RIG designs. The restraint accommodates RIG bars varying vertically from the ground and horizontally from the rear end of the trailer, even when the entrance to the loading bay is sloped.

A still further advantage of the present impact vehicle restraint is its rugged durability in harsh working environments. The non-complex nature and movements of the hook and auxiliary locking mechanism reduce manufacturing costs, binding, jamming, wear and tear and maintenance costs, which improves the overall reliability and working life of the device.

Other aspects and advantages of the invention will become apparent upon making reference to the specification, claims and drawings.

DESCRIPTION OF THE PREFERRED EMBODIMENTS

While this invention is susceptible of embodiments in many different forms, the drawings show and the specification describes a preferred embodiment of the invention. It should be understood that the drawings and specification are to be considered an exemplification of the principles of the invention. They are not intended to limit the broad aspects of the invention to the embodiment illustrated.

Figure 1A:
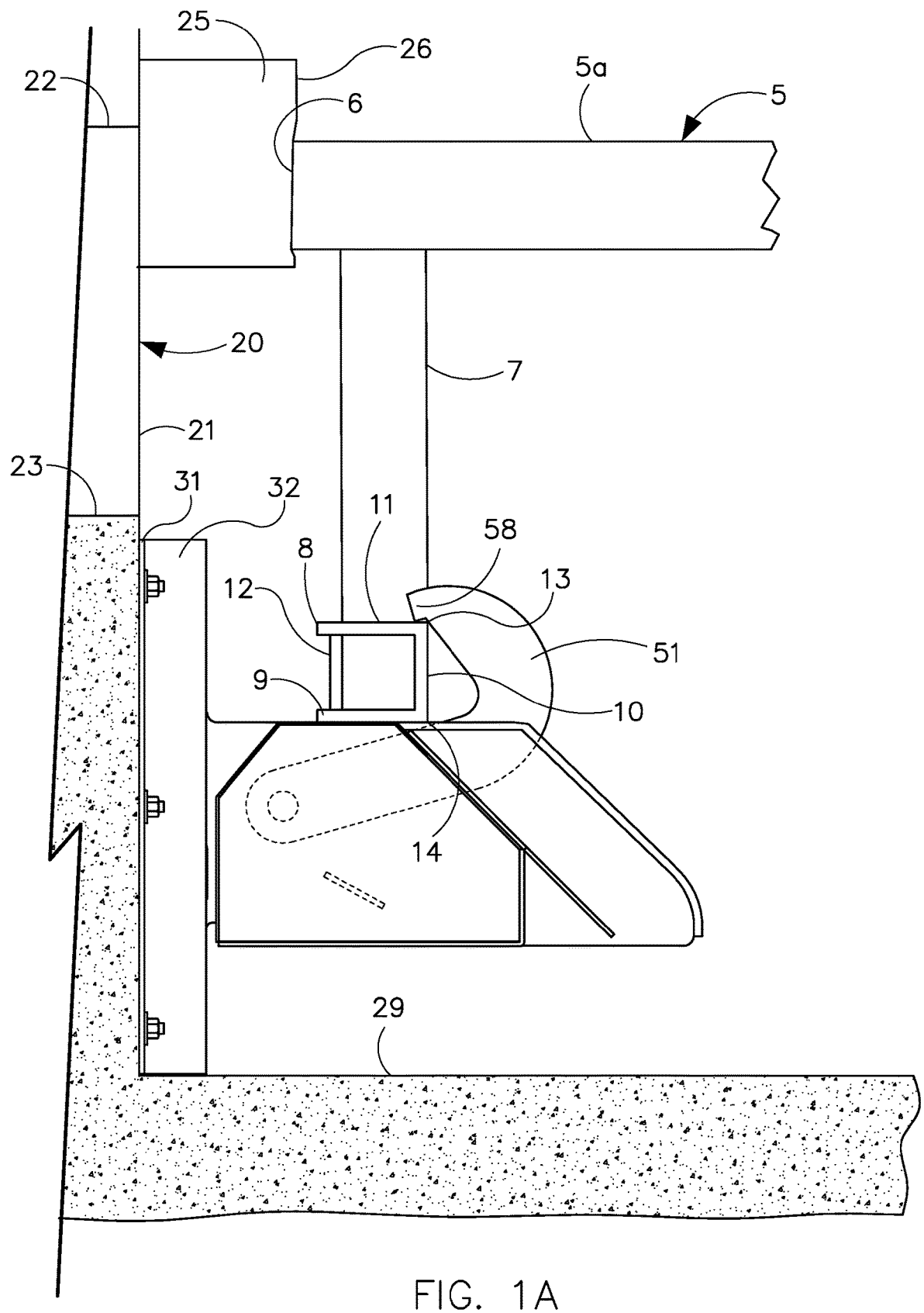
FIG. 1A is a side view of a conventional impact trailer restraint secured to the front wall of a loading dock, a trailer backed into the loading dock so that its rear end is engaging the loading bay bumpers, and with the trailer restraint hook raised to engage the trailer RIG bar so that the hook wraps around the top corner of the RIG bar to engage its upper surface.
Figure 1B:
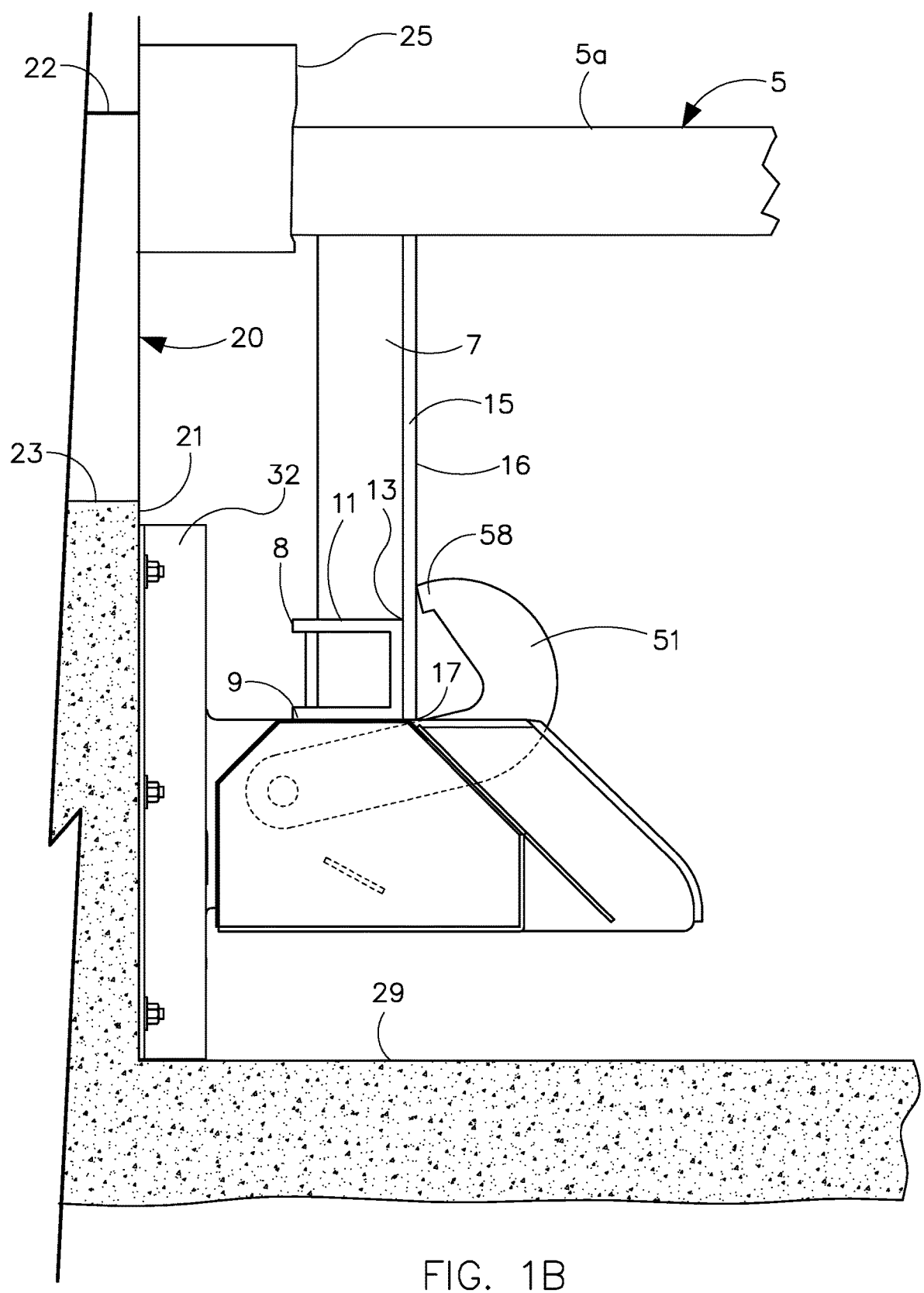
FIG. 1B is a side view of a impact trailer restraint and trailer with an obstruction in the form of a metal plate in front of the RIG bar so that the hook can only engage the smooth front surface of the plate and cannot wrap around the top corner of the RIG bar.
Figure 1C:
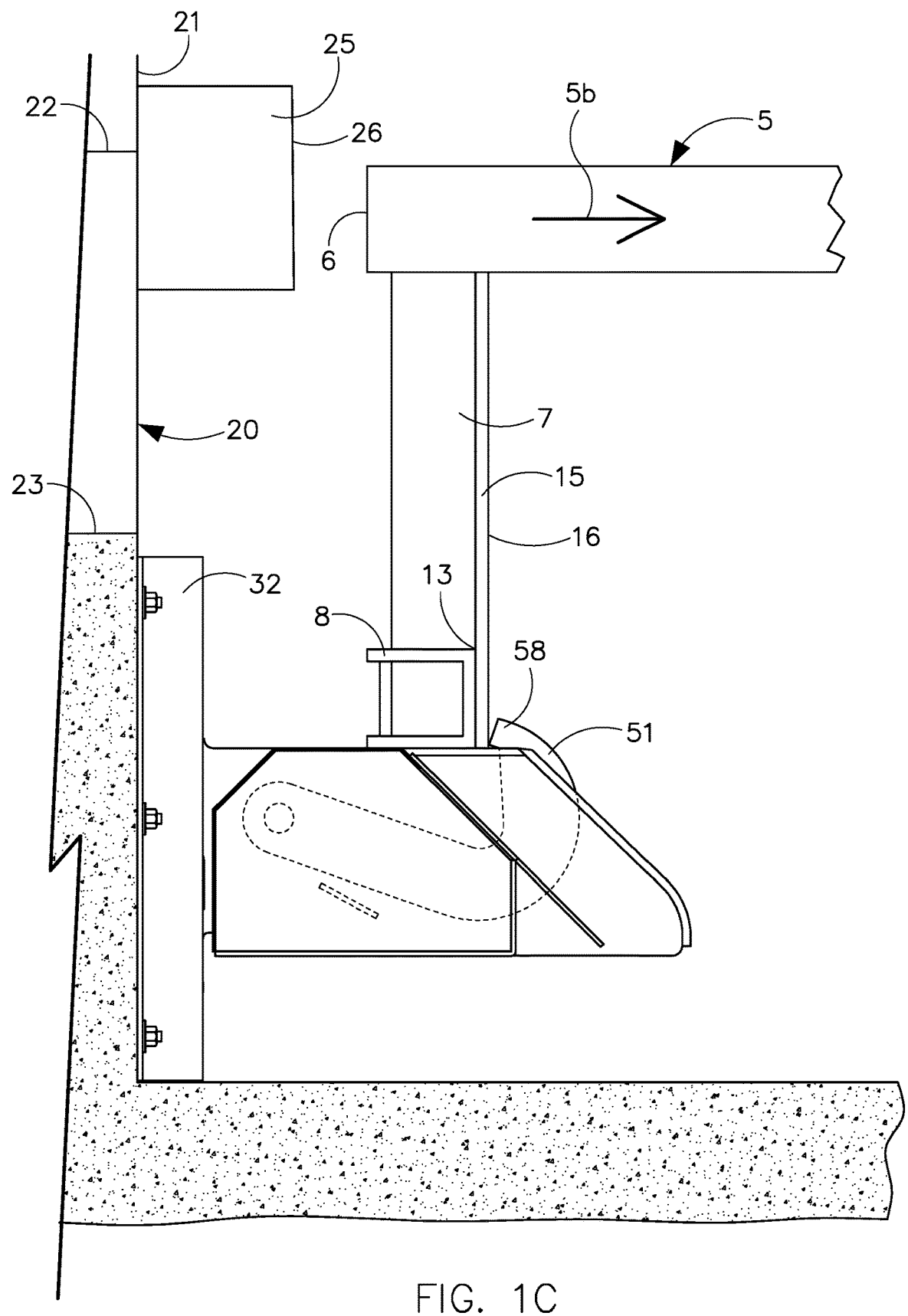
FIG. 1C is a side view of the conventional trailer restraint with the trailer moving away from the loading dock and the hook deployed but rotating down so that it is barely engaging the RIG bar and its obstruction.
Figure 1D:
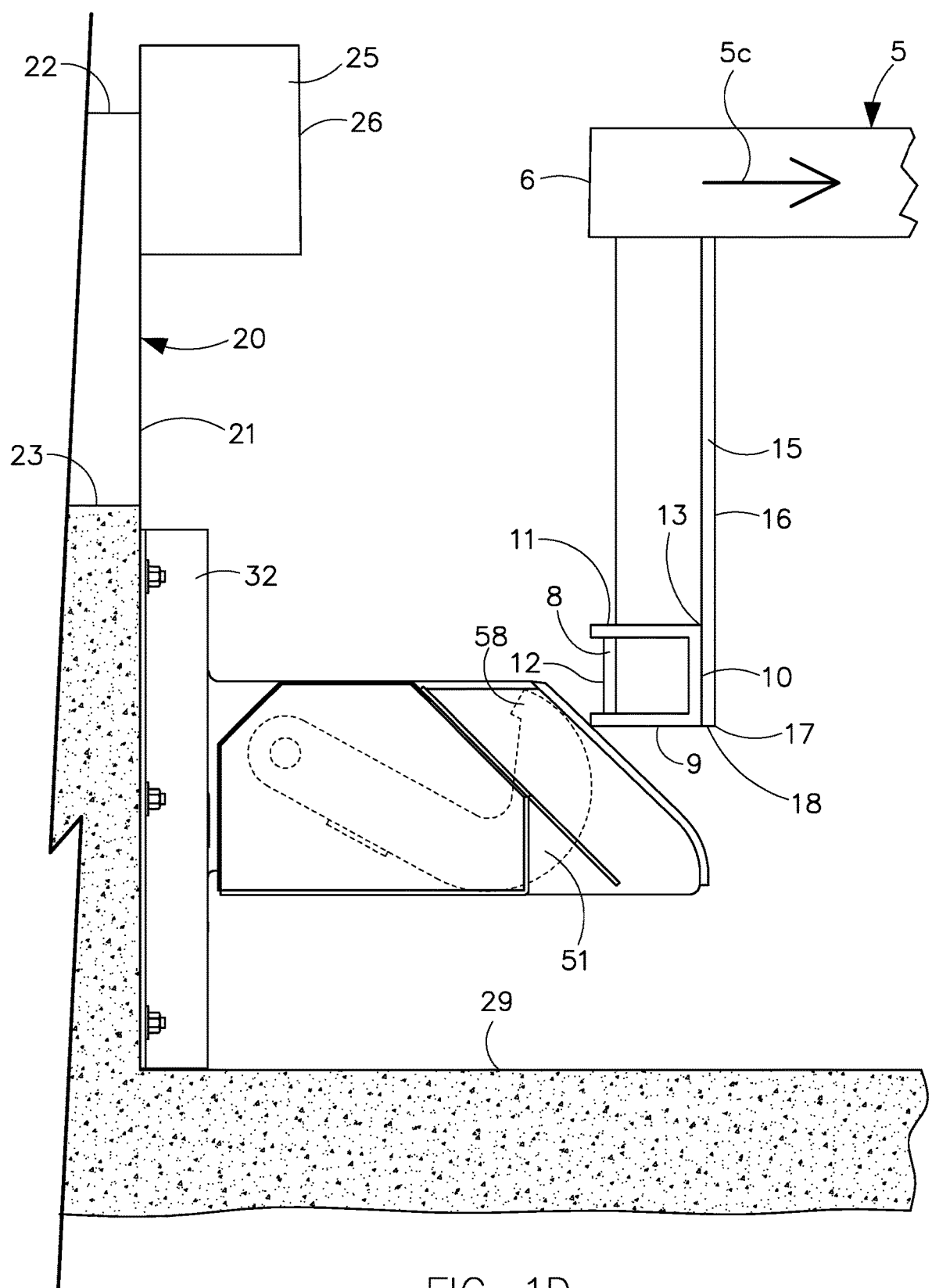
FIG. 1D is a side view of the conventional trailer restraint with the trailer moving away from the loading dock with the hook rotated down so that it no longer engages the RIG bar or its obstruction, so that the trailer is free to pull away from the dock.

Conventional truck trailers 5 have a rear end 6 equipped with a mounting structure 7 for a rear impact guard (RIG) or ICC bar 8. The RIG mounting structure 7 extends down from a location proximal to and generally a few inches from the trailer rear end 6. The RIG bar or beam 8 is generally an elongated horizontal bar. The bar 8 is generally parallel to and spans the width of the rear end 6 of trailer 5, and is used to facilitate loading and unloading the vehicle. The bar 8 has a generally square or rectangular cross-sectional shape with four sides 9-12 as shown in FIG. 1A. The bar 8 has a lower or downward facing surface 9 that is generally normal to its forward facing or front surface 10 to form upper and lower forward facing corners 13 and 14, respectively. A component or group of components is often secured to or placed over the front surface of the RIG mounting structure 7 or bar 8, which often obstruct the upper corner 13 of the RIG bar. The obstruction 15 can be a metal plate with a smooth front surface as shown in FIG. 1B. The metal plate obstruction 15 has a flat, smooth, front surface 16 and a lower corner 17 and flat bottom end surface 18 that is flush with the bottom surface 12 of the RIG bar 8.

While the RIG bar 8 obstruction 15 is shown and described as a plate, it should be understood that the RIG bar obstruction could take on many different forms that prevent the hook of a trailer restraint from wrapping around the top corner 13 of the RIG bar 8. For example, the bottom end 18 of the obstruction 15 does not have to be flush with the bottom surface 12 of the RIG bar 8, and its front surface 16 does not have to be flat or smooth. The obstruction 15 can be a part of the RIG mounting structure 7, a set of steps for climbing into the trailer, a screen or grate, a miscellaneous beam or bar, etc.

Conventional loading docks 20 have a generally vertical front wall 21 and horizontal dock floor 22 as shown in FIG. 1A-D. Loading docks are frequently equipped with a dock leveler (not shown) that is installed in a pit having a horizontal pit floor 23. Bumper pads 25 are installed proximal to and just below the dock floor 22, and to the sides of any pit. The bumpers 25 have a generally flat vertical front surface 26 for engaging the rear end 6 of the trailer 5. When the trailer 5 is backed into a loading dock 20, the rear end 6 of the trailer is generally parallel to and moves toward the face or front dock wall 21. The bumpers 25 help prevent inadvertent damage to the dock or trailer. The front surface 26 of the bumpers 25 space the rear end 6 of the trailer 5 a few inches from the front dock wall 21. The dock floor 22 is elevated above the ground surface or roadway 29 so that the bed 5a of the trailer 5 is generally level with the upper surface 22 of the dock. A dock leveler (not shown) is frequently provided to accommodate any difference in height between the bed 5a of the trailer 5 and the dock floor 22, and bridge the gap between the dock floor and trailer bed. The dock leveler has a deck that is hingably secured to be even with the dock floor 22. An extendable lip is hingably secured to the front of the deck. A lift mechanism in a pit of the dock 20 moves the deck and lip between stored and operating positions.

The present invention generally relates to a loading dock trailer restraint that is generally shown as reference number 30 in FIGS. 2-6. The trailer restraint 30 is provided for installation as a prefabricated, pre-welded and generally preassembled device or apparatus. The restraint 30 is designed for a loading dock 20 with or without a dock leveler. The trailer restraint 30 is located directly in front of the dock stall and below any dock leveler. The restraint 30 is preferably centered in front of the leveler between any spaced apart bumpers 25. The restraint 30 and its components are robustly designed to withstand a simulated trailer pull-out force of about 100,000 lbs. Various components are made of steel, and are welded together for increased strength. The steel components are zinc plated for high corrosion resistance.

The trailer restraint 30 includes a rear mounting plate 31 anchored to the front wall 21 of the loading dock 20. The mounting plate 31 is made of steel and has a uniform thickness of about ⅜ of an inch. The plate 31 has flat front and rear surfaces. The rear surface of the plate 31 flushly engages the front dock wall 21 so that its front surface is vertically orientated and parallel to the front of the dock 20. The plate 31 has a generally rectangular shape with top, bottom and side edges. The plate 31 is about 26 inches tall and 19 inches wide. The plate 31 is anchored to the front 21 of dock 20 by a number of bolts located proximal to its side edges. The fasteners are preferably concrete expansion anchors or concrete wedge anchors. Alternatively, the plate 31 can be welded to an embedded, steel, dock face plate (not shown).

A vertical track 32 is formed by the mounting plate 31 and two spaced apart L-shaped flanges 33 that form a central vertical channel about 6 inches wide. The flanges 33 are welded or otherwise rigidly secured to the mounting plate 31, and are robustly sized to handle the large loads experienced during operation. The top and bottom edges of the track 32 are generally flush with the top and bottom edges of the mounting plate 31, so that the track 32 has a total height of about 26 inches. A steel cap is secured to the top of the track 32 to close the track.

Figure 2:
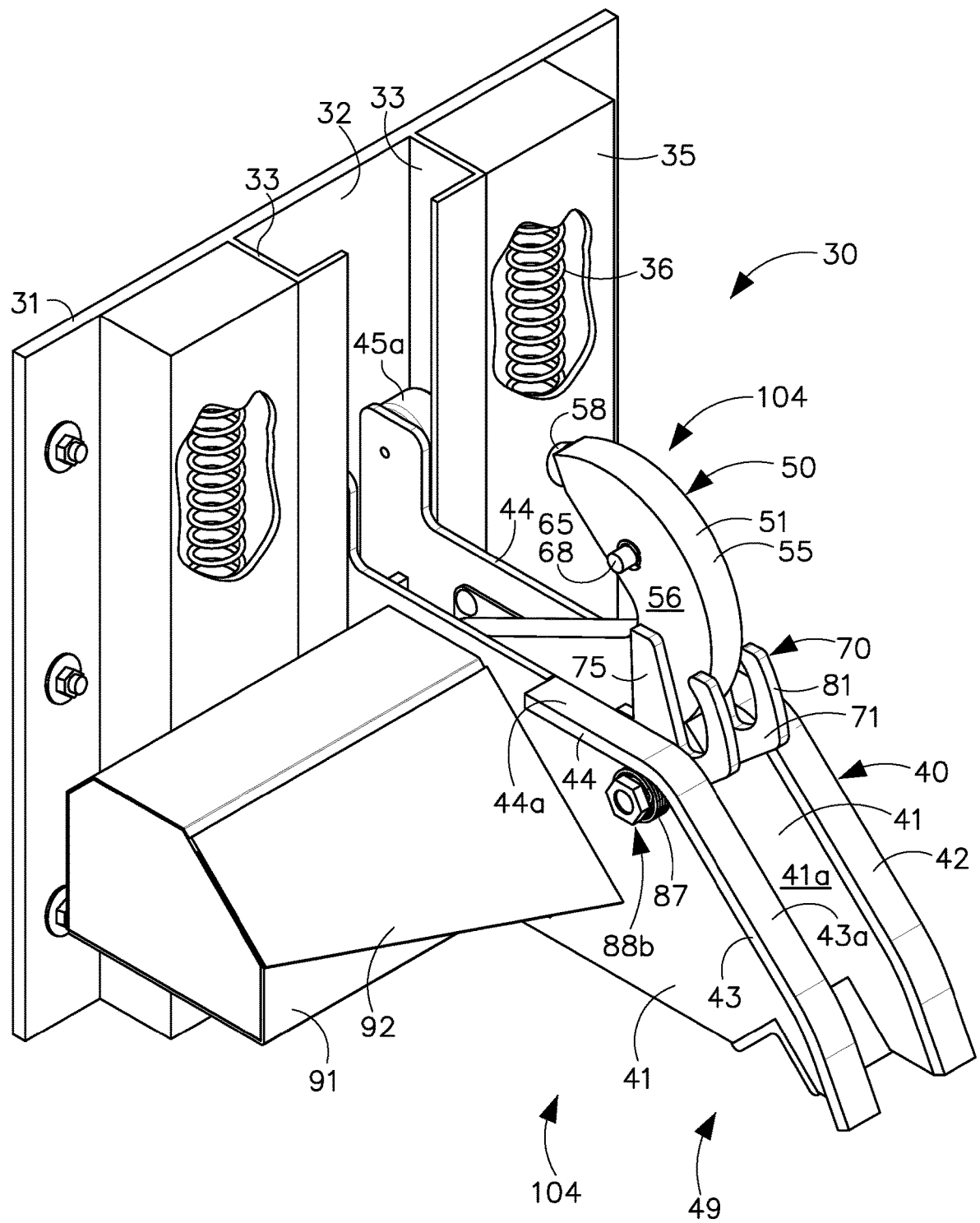
FIG. 2 is a perspective view of the impact vehicle restraint of the present invention with its hook in a raised operative position and the auxiliary locking mechanism deployed.

Spring housings 35 are rigidly secured to the mounting plate 31 as best shown in FIG. 2. The spring housings 35 straddle the track 32. Each housing 35 includes one or more springs 36 to bias the vehicle restraint 30 into an upper position. One end of each spring 36 is secured to the top of its spring housing 35, and the opposed end of each spring is secured to the lower surface of the carriage assembly 40. Each spring is sized to produce an average force of about 450 Newtons. Three springs 36 are preferably located on the motor side of the track 32 and one spring 36 is preferably located on the opposite side of the track to provide a more balanced lifting force for the carriage assembly 40.

The carriage assembly 40 extends horizontally from the mounting plate 31 and is slidably secured in the vertical track 32. The carriage assembly 40 includes two similarly shaped shear plates 41. Each plate 41 is made of steel and has a uniform thickness of about ⅜ inch defined by its generally flat, smooth side surfaces 41a. The plates 41 are in aligned parallel registry, and spaced about 2⅝ inches apart. A reinforcement strip 42 is welded into a recess in the upper end of each shear plate 41. The shear plates 41 and reinforcing strips 42 have downwardly sloped or ramped front ends 43 and flat horizontal upper ends 44. The reinforcement strip 42 and its portions 43 and 44 have a continuously smooth upper surfaces 43a and 44a. The flat vertical rear ends of the shear plates 41 are received by and extend into the track 32.

The shear plates 41 are rigidly joined together by spacing brackets, and hold a guide roller assemblies 45 that includes upper and lower rollers 45a and 45b. The upper and lower elongated axles of the guide rollers 45a and 45b pass through both plates 41 and engage the angle flanges 33 of the track 32. The guide roller assemblies 45 prevent the carriage 40 from pulling horizontally away from the mounting plate 31, while the rollers 45a and 45b allow the carriage 40 to move vertically up and down in the track 32.

The mounting plate 31, angle flanges 33, elongated axles of the roller assemblies 45 and shear plates 41 hold the carriage 40 horizontally fixed to the front surface 21 of the dock 20 to prevent outward movement or pull out of the carriage 40 from the dock. Each shear plate 41 has a hook mounting hole and an auxiliary lock mounting hole, and their inside surfaces have an inwardly extending hook stop 46 and an inwardly extending auxiliary lock stop 47. The springs 36 of the trailer restraint 30 bias the carriage 40 into an upper position 48. The carriage is movable along track 32 between the upper biased position 48 shown in FIG. 3A and a lower stored position 49 shown in FIGS. 2 and 6.

The carriage 40 preferably includes a toe piece (not shown). The toe piece is flushly positioned between the parallel shear plates 41 and extends at a downward angle from the plates to increase the length of the sloped forward surface of the carriage 40. The upper surface of the toe piece is flushly aligned with the downwardly sloped front ends 43 of the reinforcement plates 42. The bottom edge of the toe piece is generally horizontally aligned with the lower edge of the mounting plate 31. A toe pin joins the front ends of the shear plates 41 and the toe piece together. When extended, the toe piece extends the sloped forward surface formed by the shear plates 41 or reinforcement plates 42.

Figure 5:
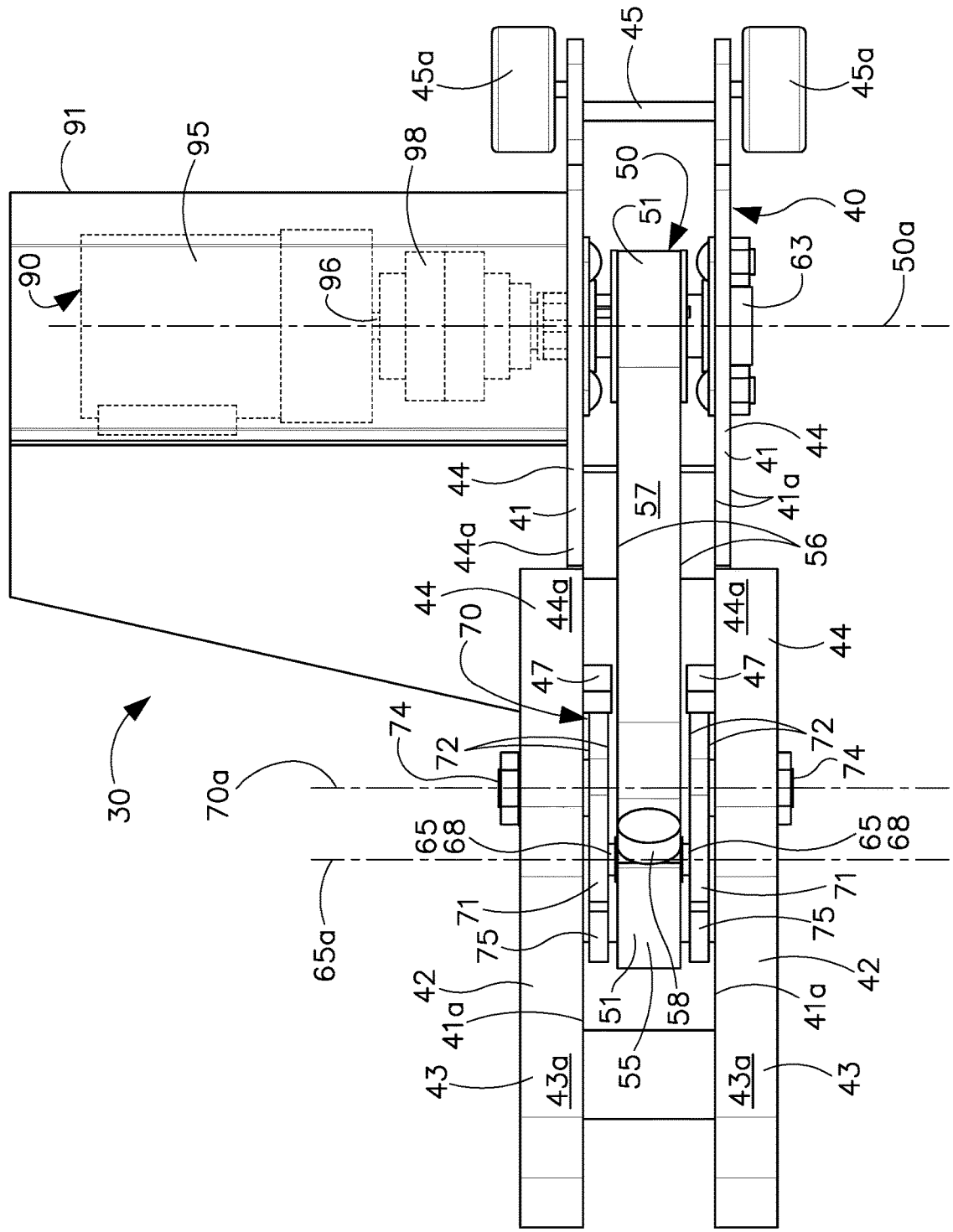
FIG. 5 is a top view of the trailer restraint showing its drive mechanism coupled to the hook, and where the hook and auxiliary locking mechanisms are retracted into their fully lowered or stored positions.
Figure 6:
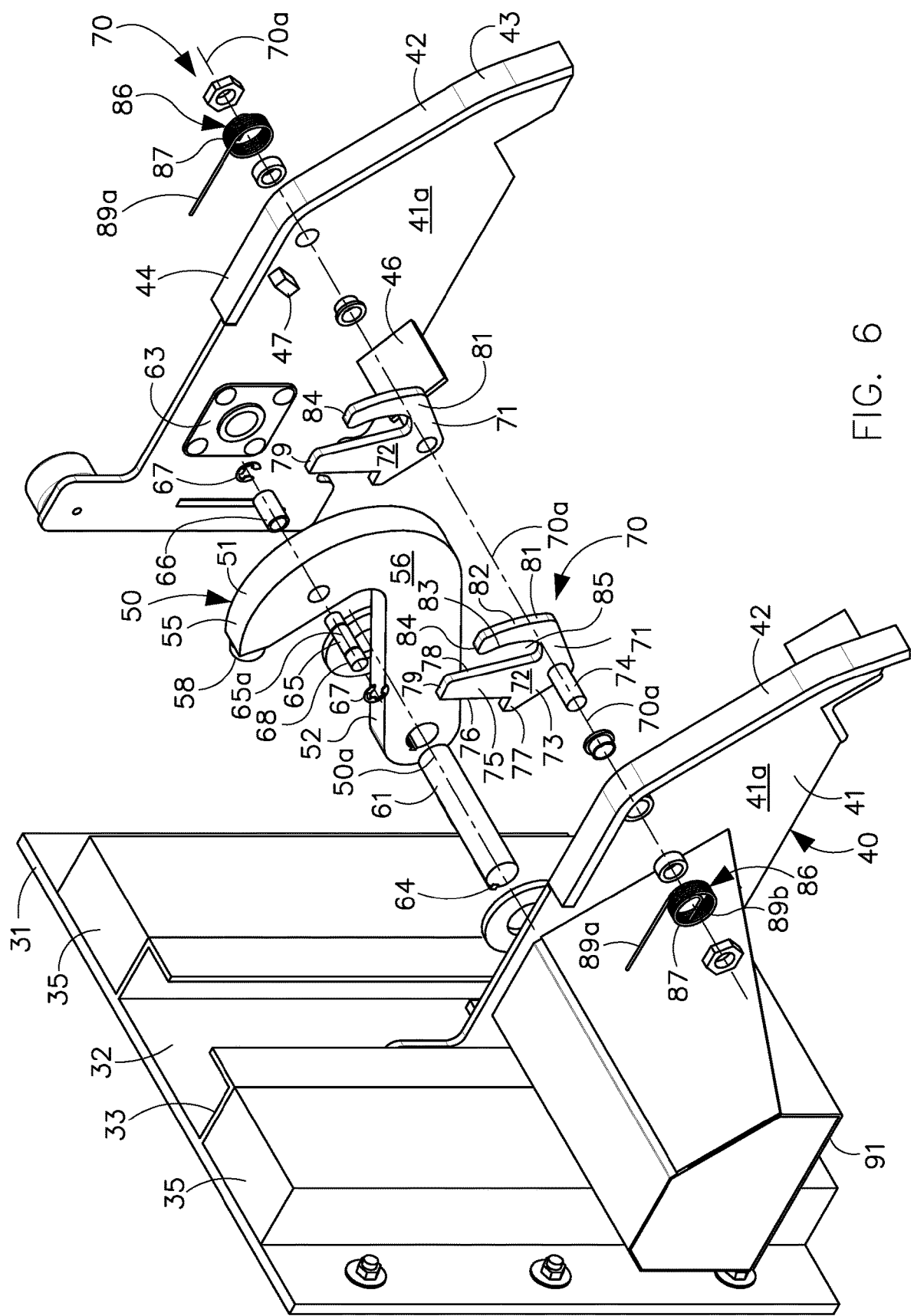
FIG. 6 is a partially exploded perspective view of the trailer restraint to better show the components forming the hook and auxiliary locking mechanism assemblies.

The carriage assembly 40 carries a rotatable hook assembly 50 to selectively engage and disengage the RIG bar 8 or any obstruction 15 to hold the truck trailer 5 against or capture it in close proximity to the loading dock 20 and its bumper pads 25. As best shown in FIGS. 2, 5 and 6, the assembly or mechanism 50 includes a hook 51 that has a solid steel body with an inner straight section 52 having a length of about eleven inches, an elbow 54, and a pendent hooked end 55 that extends up a distance of about 5¾ inches at an angle of about 70 degrees backward relative to the straight section 52. The hook 51 has a uniform thickness of about 1¼ inches defined by its flat, smooth side surfaces 56. The hook 51 also has an inner surface 57 and a rearwardly facing free end or top surface formed by a grip disc 58.

The hook 51 nests between and its sides 56 are in planar orientation to the sides 41a of the shear plates 41. The hook 51 is rotatably secured to the shear plates 41 by a hook mounting pin 61 that forms its axis of rotation 50a. The hook pin 61 is rotatably mounted to and held by the shear plates 41 via a hub and bearing assembly 63 secured around and passing through in the hook mounting holes of the shear plates 41. A locking rib 64 fixes the hook 51 to a rotatable inner sleeve of the bearing assembly 63, which allows the hook 51 to rotate about and transfer large loads to shear plates 41. The hook 51, hook pin 61 and bearing assemblies 63 are robustly sized to handle the large loads experienced during operation. As discussed below, the rotatable hook 51 carries an auxiliary plate engagement pin 65. The pin 65 is secured to the middle portion of the hooked end 55. The pin 65 has a length of about 2⅜ inches and passes through the body of the hook 51. The pin 65 is rotatably held by a bearing 66 fixed within the hole in the hook by a pair of opposed clips 67. The ends 68 of the pin 65 extend from each of the hook sides 56 a distance of about ½ inch.

The shear plates 41 also carry a rotatable auxiliary securing or locking mechanism 70 to selectively engage and disengage the RIG bar 8 or any obstruction 15 to ensure the truck trailer 5 is held against or captured in close proximity to the loading dock 20 and its bumpers 25. As best shown in FIG. 6, the assembly or mechanism 70 preferably includes a pair of generally flat locking plates 71. Each plate 71 is made of steel and has a thickness of about ⅜ inch defined by its opposed, generally flat, smooth side surfaces 72. Each plate has a base 73 with a forward edge and pivot pin 74. The forward edge is selectively rotatably aligned with and adapted to engage the auxiliary stop 47. Each pin 74 is received by the auxiliary mounting hole of its corresponding shear plate 41 to rotatably secure the plate 71 to the shear plates 41. Each pin 74 extends outwardly from one side 72 of its respective plate 71, and is generally normal to the plate side surfaces 72. Each pivot pin 74 has a centerline 70a that forms the axis of rotation for its plate 71. The pins 74 and their centerlines 70a are linearly aligned so that they share a common axis of rotation, with the plates 71 being in uniform parallel registry when viewed from the side. The auxiliary lock plates 71 are not fixedly joined together. They remain in registry via their engagement with their aligned stops 47 and hook pin 65. Each plate 71 is independently driven by a separate biasing mechanism 86 as discussed below.

Each plate 71 has a RIG retaining arm 75 and an auxiliary plate retraction arm 81. The arms 75 and 81 extend outwardly from the base 73. The abutment arm 75 extends from the base 73 in a direction axial to the pin 74. The retraction arm 81 extends from the base 73 in a direction that is initially axial to the pin 74 and is then curved to further extend in the direction of the abutment arm 75. The RIG retaining arm 75 has a flat rearward RIG engaging surface 76, a shoulder 77, an angled forward surface 78 and an outer end 79. The RIG engaging surface 76 has a length of about 3¼ inches. The RIG abutment surface 76 is normal to the shoulder abutment surface 77. The retraction arm 81 has an arcuate shape with an outer forward surface 82, an inner rearward surface 83 and an outer end 84. The retraction arm 81 has a total length of about three inches. The plates 71, as well as their bases 73 and arms 75 and 81, are mirror images of each other, with their pins 74 extending in opposite directions.

Each of the dual locking assemblies 70 includes a biasing mechanism 86 that rotatingly biases its plate 71 toward its stop 47. When the plate 71 is pressed and held against the stop 47 by the biasing mechanism 86 it is in its set position 88b. When held at this set position 88b, the shoulder 77 of RIG engaging arm 75 is in generally flush with but slightly recessed (about three degrees) from co-planar registry with the flat upper surfaces 44a of the carriage 40 and its shear plates 41 and reinforcement plates 42. The flat rearward RIG engaging surface 76 is angled backward toward the dock 20 about three degrees from normal relative to the upper carriage surfaces 44a. The inner edges 78 and 83 of arms 75 and 81 form a central channel or groove 85. The channel 85 is sized and shaped to non-bindingly receive the auxiliary plate engaging pin 65 of the hook assembly 50.

The biasing mechanism 86 preferably includes two coil springs 87. Each spring 87 drives the rotation of its plate 71 from a stored position 88a toward the deployed or set position 88b. At the set position 88b, the rearward edge of the base 73 of each plate 71 is pressed against its corresponding stop 47. Each spring 87 has a straightened securement portion 89a and a bent securement end 89b. As discussed below, the biasing mechanism 86 works in cooperation with the auxiliary plate engaging pin 65 of the hook 51 to rotate the plates into their desired positions 88a and 88b. The open interior of each coil spring 87 is received by pin 74. The bent end 89a of the spring 87 is pinched between the bushing and retaining clip. The elongated end 89b of the coil spring 86 is in secured pressed engagement with the underside surface of the reinforcement strip 42.

A drive unit 90 selectively rotates the hook 50 between its stored position 101 and a range of raised operating positions, such as positions 104-107 discussed in more detail below. As best shown in FIG. 5, the drive unit 90 is mounted inside a protective housing 91 that is rigidly secured to the side of one shear plate 41. The drive unit 90 preferably keeps the hook 51 in torque engaging contact with the RIG bar 8 or obstruction 15 during operation. The housing 91 has a removable cover 92 to allow access to the drive unit 90. The drive unit 90 includes a motor 95 that turns a drive shaft 96. A motor mount collinearly aligns the drive shaft 96 with the hook pin 61, and a coupling 98 rotationally joins the motor drive shaft 96 to the hook pin 61. The coupling 98 is preferably a direct one-to-one coupling between the motor drive shaft 96 and the hook pin 61 to obtain a better mechanical advantage.

The motor 95 is preferably an electric, constant torque, alternating current motor. The motor 95 continues to apply torque after the hook 51 rotates to an operating position 104 and is engaging the RIG bar 8 or any obstruction 15. The gearmotor 95 preferably uses a helical gear to produce a 180:1 gear ratio to allow direct coupling 98 between the drive shaft 96 and the hook pin 61. The gearmotor 95 preferably has at least two modes of operation. In its first or higher power mode, the gearmotor draws 0.75 amps at 120 volts, and produces 305 lb-in of torque. The gear reduced no-load output shaft speed is 10 rpm. This mode of operation is used to rotate the hook 51 to and from its stored and raised positions. Once the hook 51 engages the RIG bar 8 or obstruction 15, the output shaft of the motor 95 stops rotating, but maintains its torqued engagement with the RIG bar or obstruction. In its second or lower power mode, the gearmotor 95 draws 0.6 amps at 85 volts, and produces 135 lb-in of torque. This mode of operation is used while the hook 51 remains engaged with the RIG bar 8 or obstruction 15. Torqued engagement continues until the motor 95 rotates the hook 51 back to its stored position 101. The higher power mode is meant to quickly overcome hook inertia as well as to aid in overcoming external resistances to motion such as (dirt, snow, etc.). The lower power mode is intended to allow the motor 95 to be powered continuously without risk of overheating.

The constant duty motor 95 is controlled by a control system (not shown). The control system turns the motor 95 on and off, and switches between high and low power modes of operation. Each operating cycle includes a hook engagement phase, a hook holding phase and a hook return phase. During the hook engagement phase, the control system activates the motor 95 and operates the motor at its higher power mode. During this phase, the motor 95 rotates the hook 51 from its stored position 101 to its engaged or raised positions 104. The duration of this phase is timed by the control system, and is preferably about 5 seconds. During the hook holding phase, the control system keeps the motor 95 activated, but operates the motor at its lower power mode. The control system operates the motor 95 at this lower power level indefinitely or at least until the loading and unloading of the truck trailer is complete. This operating phase is to maintain the hook 51 in forced or torqued engagement with the RIG bar 8 or obstruction 15 while the trailer 5 is hooked by hook 51 or captured by the hook and auxiliary locking mechanisms 50 and 70. When the loading and/or unloading process is complete, the control system is selectively switched to the hook disengaging phase. During this phase, the motor 95 is operated at its high power mode but in the reverse direction to rotate the hook 51 from its engaged position 104 to its stored position 101. The duration of the phase is timed by the control system, and is also preferably about 5 seconds. When the hook 51 reaches its stored position 101, the control system deactivates the motor 95 and stops supplying amperage and voltage to the motor. With the hook 51 and auxiliary locking plates 71 out of the way and the operating cycle complete, the trailer 5 can pull away from the loading dock 20. When the RIG bar 8 clears the carriage 40, the carriage springs 36 return the carriage to its upper biased position 48 so the restraint 30 is ready to receive another trailer 5.

Figure 3A:
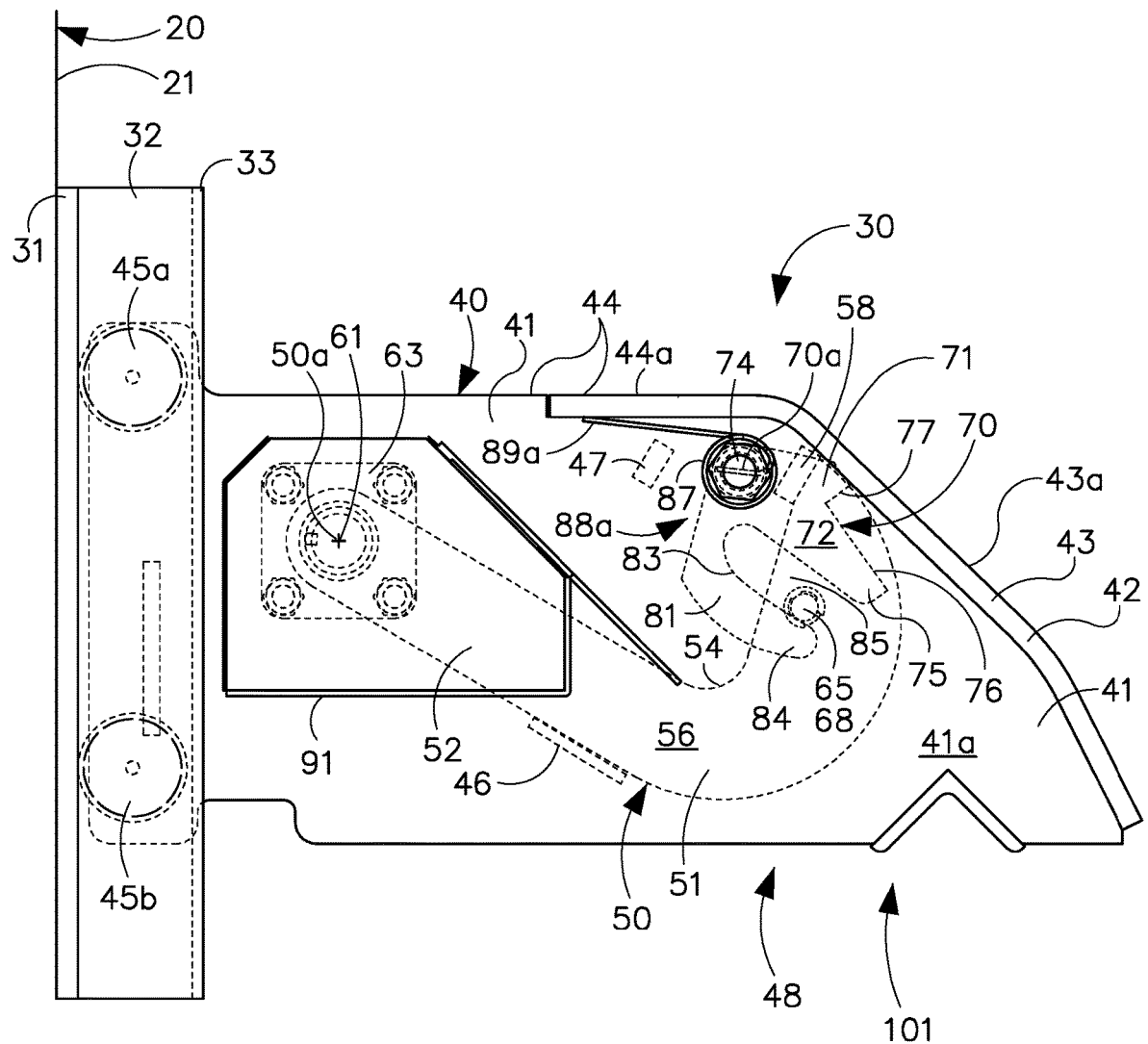
FIG. 3A is a perspective view of the present vehicle restraint with its hook in a fully lowered or stored position bellow the top surface of the carriage and its shear and reinforcement plates, and with the hook pin pressing down against the auxiliary plate to maintain the auxiliary locking mechanism in a retracted or stored position below the top surface of the carriage and its shear and reinforcement plates.

The hook 51 and locking plates 71 are rotatable through a range of positions 101-107 as shown in FIGS. 3A-D and 4A-D. When in their stored positions 88a and 101, the hook 51 and auxiliary locking plates 71 are housed between the shear and reinforcement plates 41 and 42, and are below their horizontal and ramped upper surfaces 43a, 44a as shown in FIG. 3A. The hook 51 is rotated to rest on or engage hook stop 46. The auxiliary plates 71 are pushed down into their retracted position 88a by the engagement of the hook pin 65 against the inner surface 83 of plate arm 81 proximal its outer free end 84. The torque applied by the motor 95 to drive the rotational movement of the hook 51 is sufficient to overpower the force of the biasing spring 87 and push down and hold down the locking plates 71. The length and curvature of retraction arms 81 and their free ends 84 is sufficient to push the plates 71 down into their retracted position 88a. In this retracted or stored position 88a, 101, the RIG bar 8 of a trailer is free to slide along the ramped front 43 of the carriage 40 and up onto its upper end 44 without contacting the hook 51 or plates 71.

During operation, when the RIG bar 8 is above and pushing down on the upper surface 44a of the carriage 40 and shear plates 41, the drive mechanism 90 rotates the hook 51 from its retracted position 101 (FIG. 3A) through a range of non-operational intermediate positions, such as position 102 (FIG. 3B) and a range of operational positions 103-107 including an operational lower position 103, 107 (FIG. 3C) and operational higher positions 104-106 (FIGS. 3D and 4A-D). The hook 51 preferably initially engages the RIG bar obstruction 15 in operational higher position 104 with the rear 6 of the trailer 5 is engaging the dock bumpers 25 as in FIG. 3D and FIG. 4A. The raised hook 51 holds the trailer 5 against or proximal to the loading dock and bumpers 25.

Figure 3B:
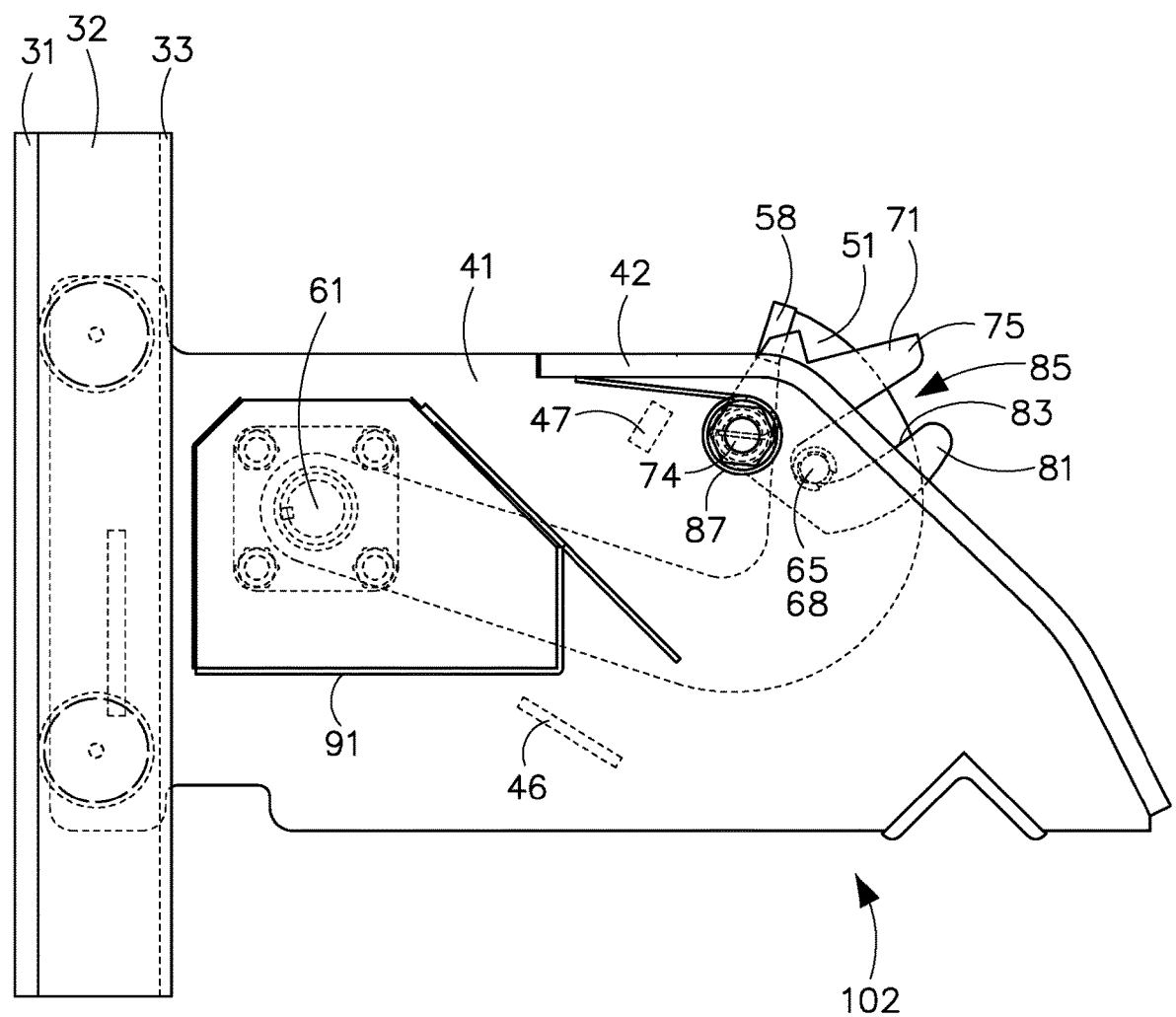
FIG. 3B is a side view of the present impact vehicle restraint with its hook and auxiliary locking plate beginning to rotate up and out of the carriage from between the shear plates.
Figure 3C:
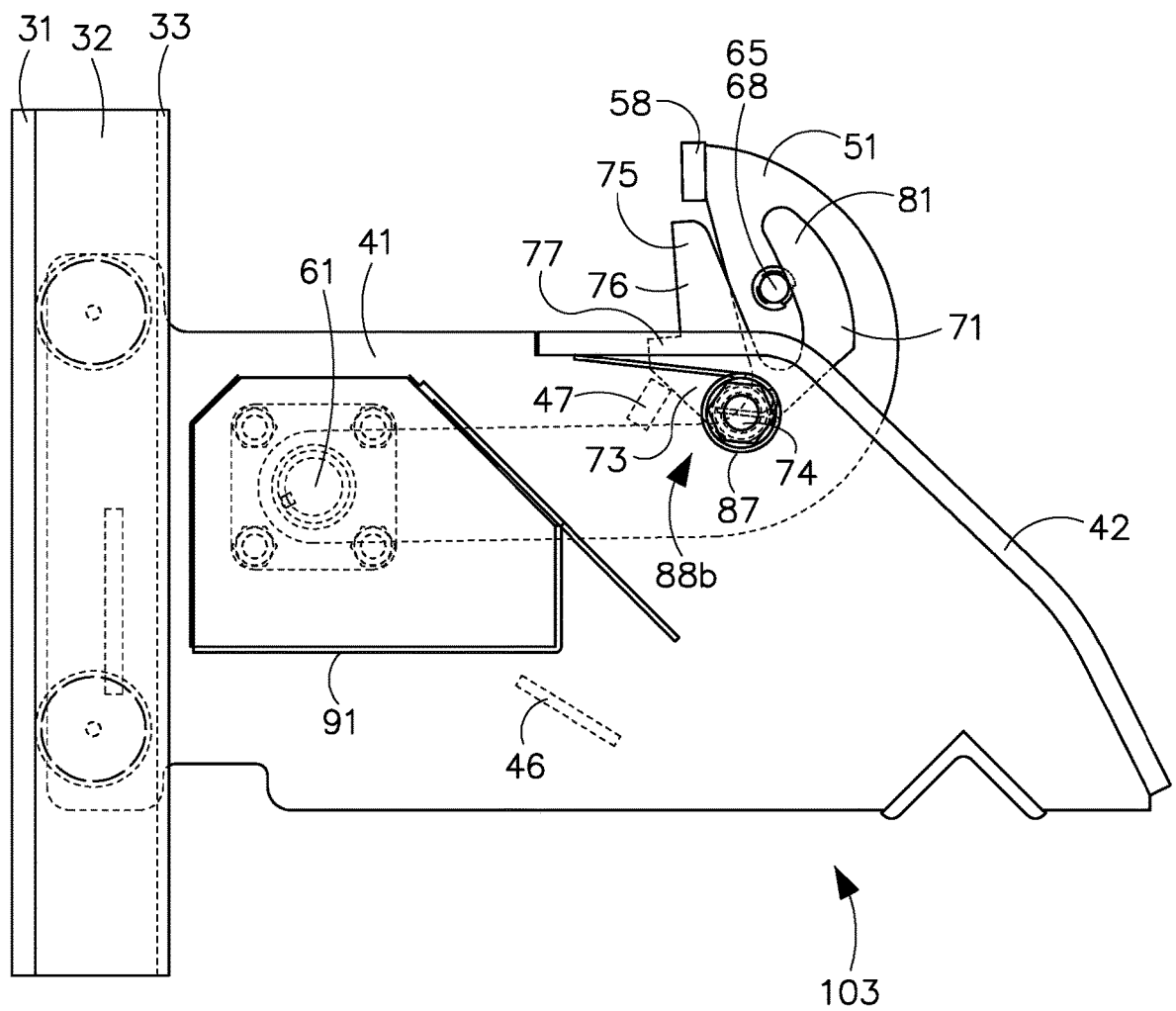
FIG. 3C is a side view of the present vehicle restraint with the hook and auxiliary locking plates further rotated out from between the shear plates to a set point where each of the auxiliary locking plates engage a stop that prevents further upward rotation of the auxiliary plates and where the hook pin releases from engagement with the auxiliary locking plates as the hook continues its upward rotation to engage the RIG bar and its obstruction.
Figure 3D:
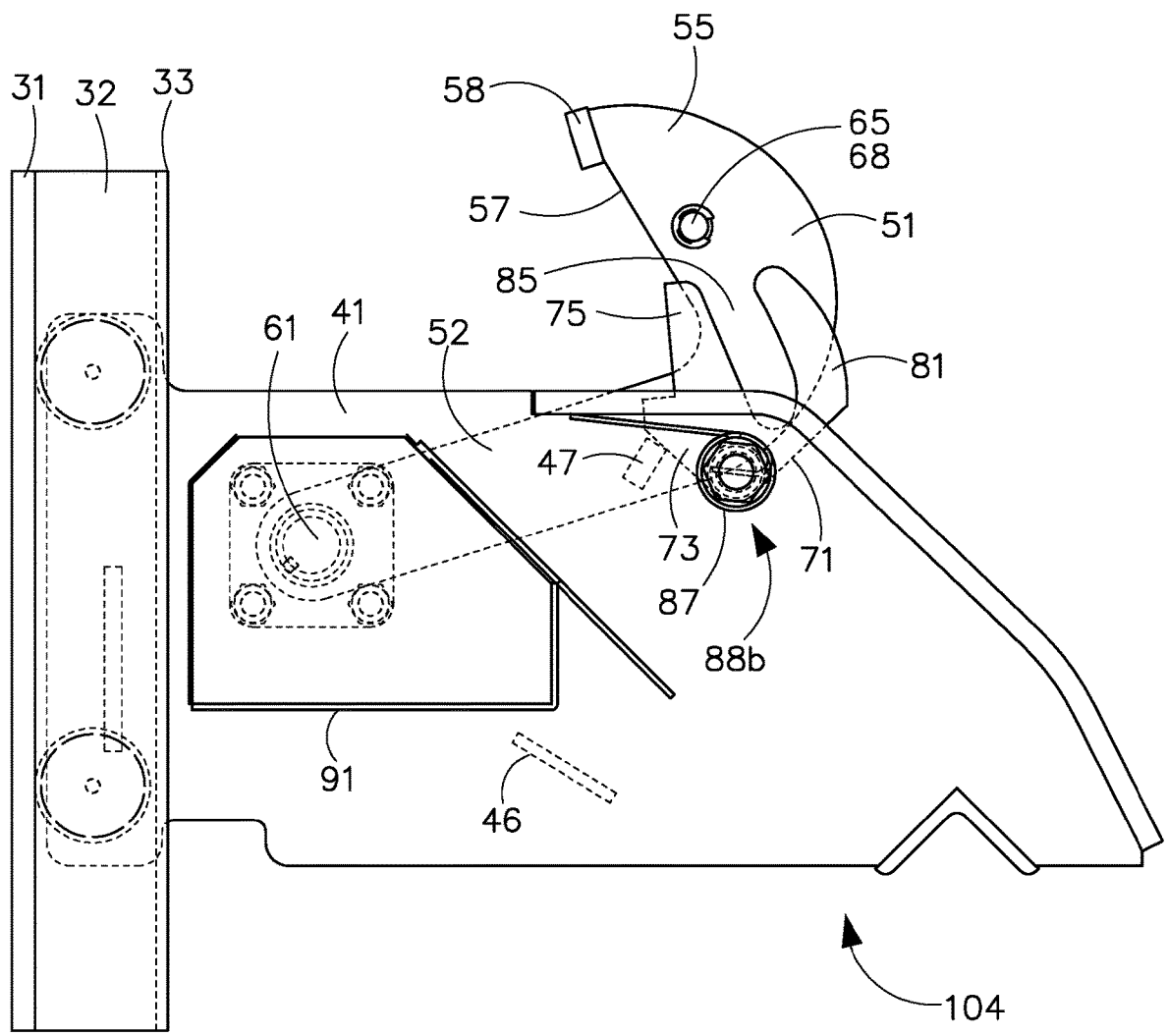
FIG. 3D is a side view of the present impact vehicle restraint with its hook in an operative raised position and with the auxiliary locking mechanism deployed to its set position.

The rotational movements of the hook 51 and auxiliary locking plates 71 are similar during their raising and lowering operations. The raising or deploying operation has two stages. During the first stage (FIGS. 3A-3C), the motor driven hook 51 and auxiliary locking plates 71 move together in engaged rotationally unison, with the plates moving rotationally faster than the hook. As they beginning to rotate to intermediate position 102 out from between the shear plates 41 (FIG. 3B), the rotation of the hook 51 is powered by the motor 95. Although the locking plates 71 are biased upwardly to their biased position 88b by springs 87, the ends 68 of the hook pin 65, which is inside the arcuate plate channel 85, pushes down on the inner end 83 of arm 81 as in FIG. 3B, so that the hook 51 and plates 71 move in mated unison between positions 101, 102 and 103 as shown in FIGS. 3A-C. When the driven hook 51 and biased plates 71 reach an operational lower raised position 103 as in FIG. 3C, the outer rearward edge of the base 73 of plates 71 engage stops 47. Once so engaged at this set biased position 88b, the rearward rotation of the plates 71 stop. The plates 71 disengage from mated rotational movement with the hook 51, and are held at and remain in this position 88b, 103 by the biasing springs 87, which are no longer being overpowered by the forced movement of the motor 95 driven hook 51. During the second stage of the raising operation between the operational lower raised position 103 and a higher raised position 104 (FIGS. 3C-3D), the motor 95 continues to rotate the hook in the same upwardly and rearwardly direction to a higher raised position 104 to engage the RIG bar 8 or obstruction 15 as in FIGS. 3D and 4A. The plates 71 remain pressed against stop 47 by their biasing spring 87, and the plate engaging pin 65 of the hook 51 travels out of plate channel 85.

During the deployment and operation of the trailer restraint (FIGS. 4A-4D), the hook 51 and locking plates 71 combine to ensure the RIG bar 8 remains captured, even when an obstruction 15 prevents the hook from wrapping around the upper front corner 13 of the RIG bar 8. The hook 51 travels between the operational lower raised position 103, 107 and a range of higher raised positions 104-106 during deployment.

Figure 4A:
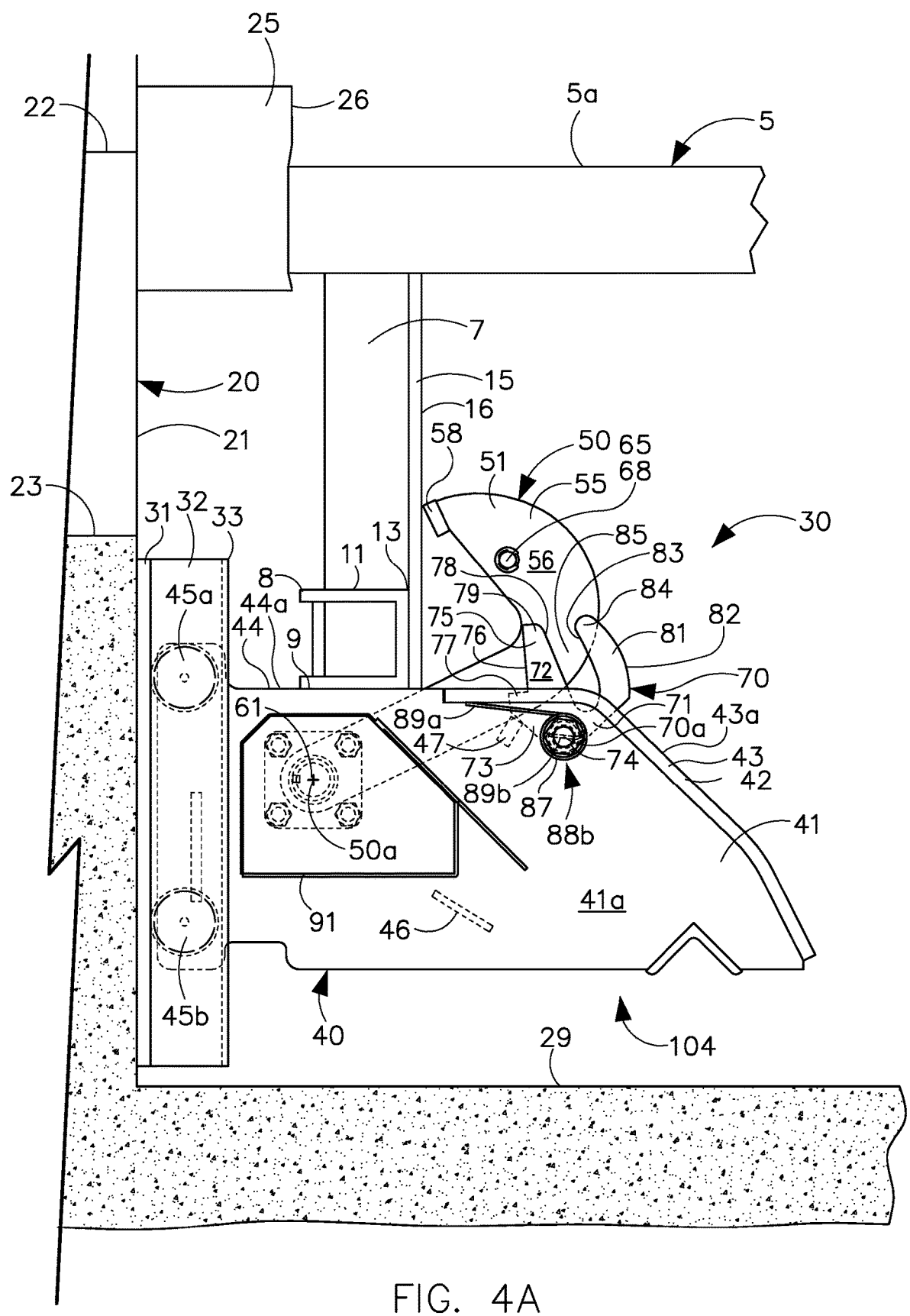
FIG. 4A is a side view of the present trailer restraint secured to the front wall of a loading dock, and where a trailer is backed into the dock bay so that its rear end engages the dock bumpers, and where the hook and auxiliary locking mechanism are deployed with the hook engaging the RIG bar obstruction and the auxiliary locking mechanism deployed to its set position.
Figure 4B:
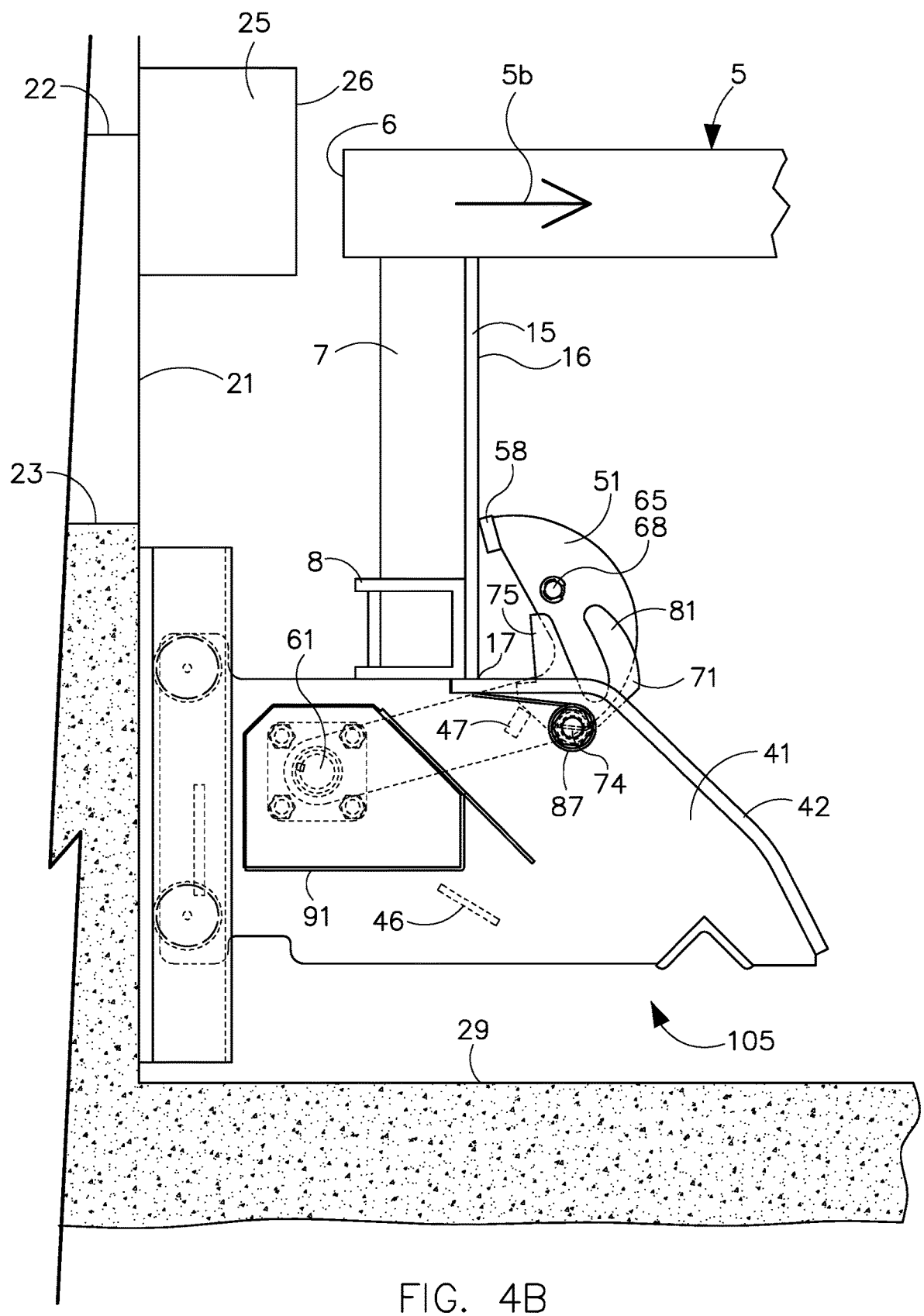
FIG. 4B is a side view of the trailer restraint with the trailer moving away from the dock wall with the hook rotating down and the RIG bar and its obstruction sliding forward along the upper surface of the carriage and its shear plates.

Initially, only the hook 51 engages the front of the RIG bar 8 or its obstruction 15 as in FIG. 4A. The top 58 of the hooked section 55 presses against the front 16 of the RIG bar 8 obstruction 15. The locking plates 71 are not engaged with the RIG bar 8 or obstruction 15. Yet, in the limited situations when a driver inadvertently pulls away from the loading bay when the hook 51 is still deployed and the loading or unloading operation is not complete, or due to 'dock walk" during the loading or unloading process when an obstruction 15 blocks the hook 51 from engaging the front corner 13 of the RIG bar 8, the trailer 5 can move away from the dock wall 21, which rotates the hook 51 down to a lower position 106 as in FIG. 4B. This forward movement of the trailer 5 and downward movement of the hook 51 can continue through position 106 (FIG. 4C), until the front 10 of the RIG bar 8 or front 16 of obstruction 15 engages the flat abutments 76 of plate 71 arms 75 as in FIG. 4D. At this operationally lower raised position 107, the elongated portion 52 of the hook 51 is preferably generally parallel to the ground 29 or perpendicular to the dock wall 21, and the to RIG engaging surface of the grip disc 58 is generally in flush engagement with the front surface of the obstruction 15.

Figure 4C:
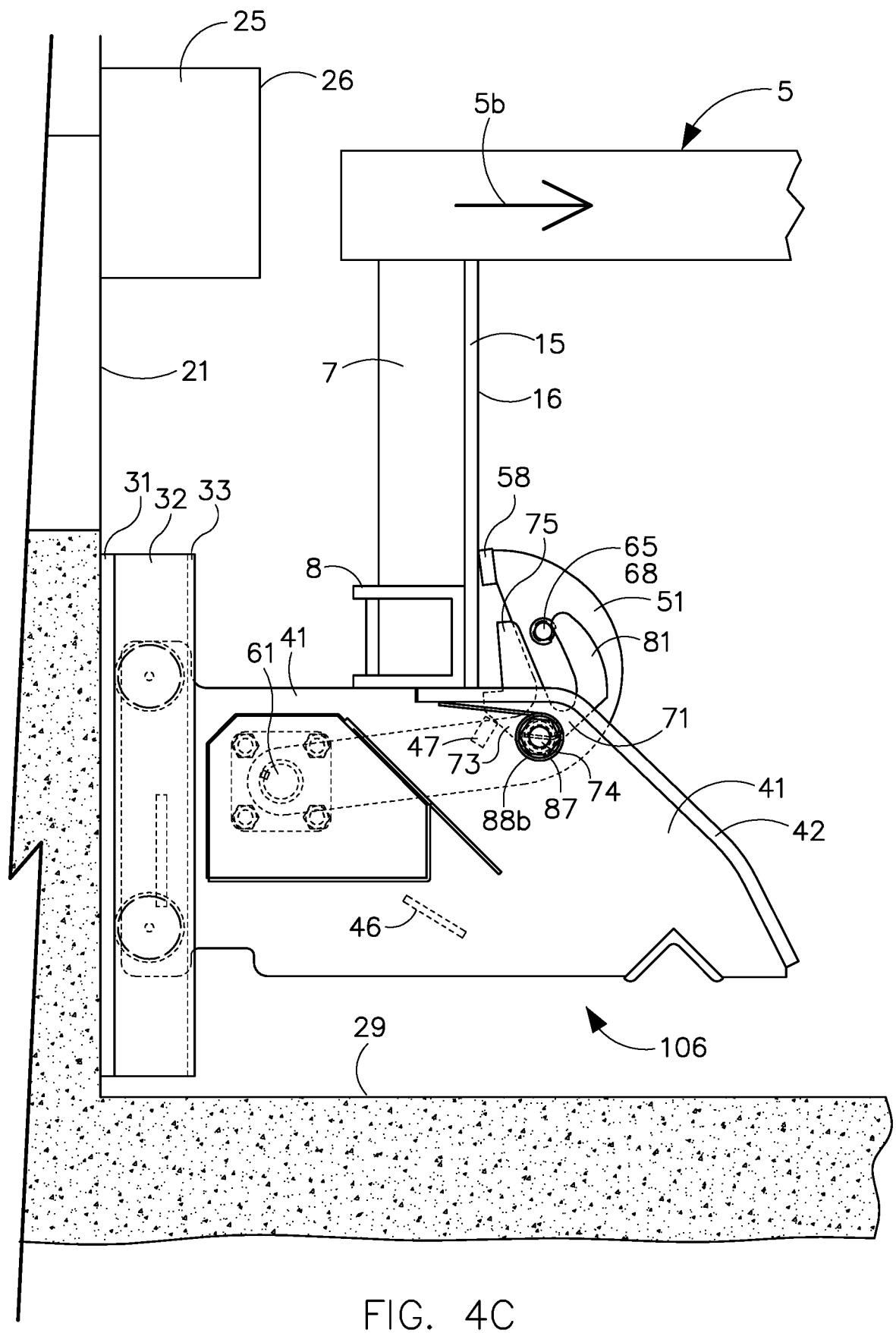
FIG. 4C is a side view of the trailer restraint with the trailer moving further away from the dock wall with the front surface and lower corner of the RIG bar and its obstruction approaching the auxiliary locking mechanism.
Figure 4D:
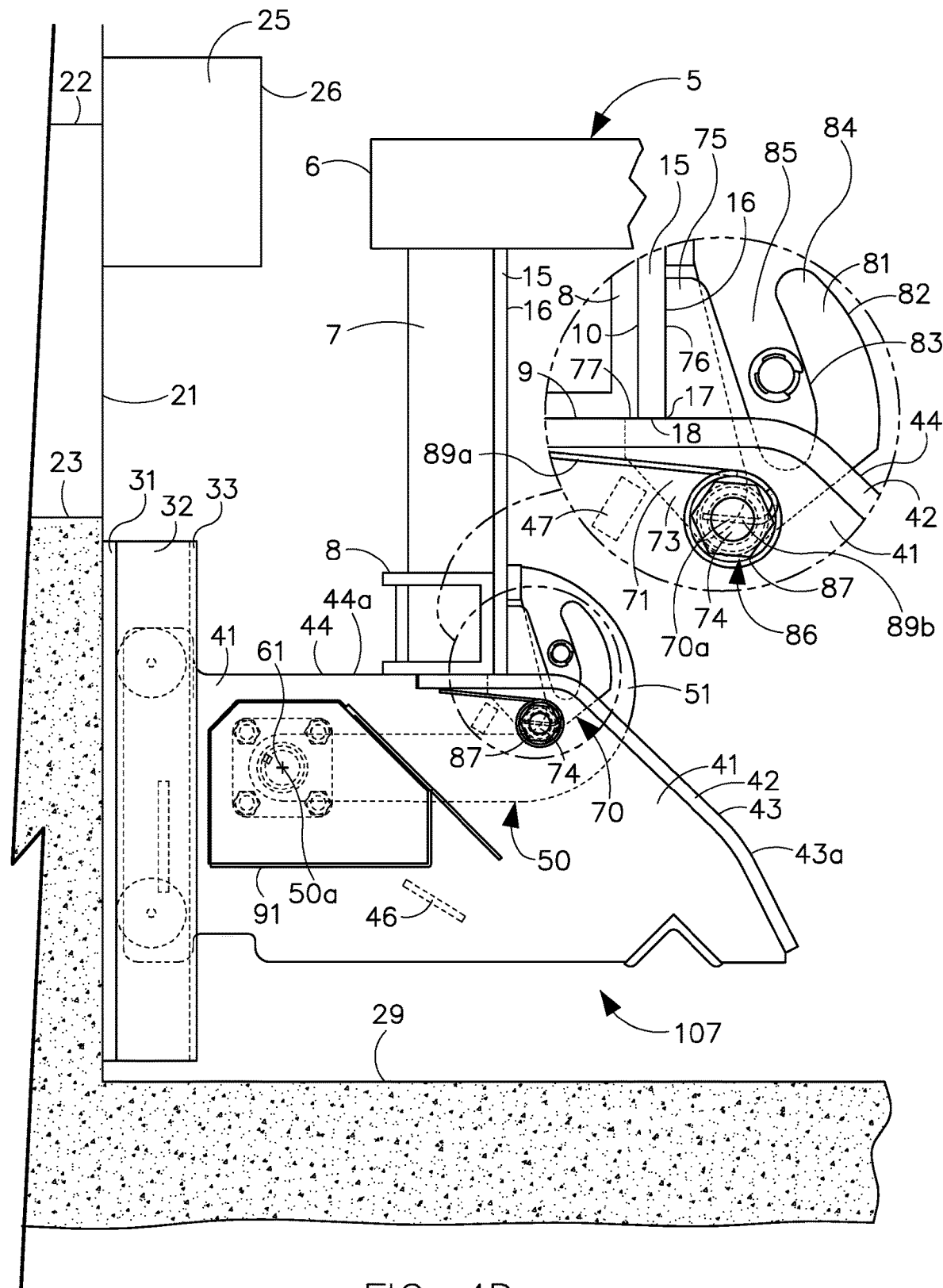
FIG. 4D is a side view of the trailer restraint with the trailer RIG bar and obstruction moved into locked engagement with the auxiliary locking mechanism so that the vertical front surface of the RIG plate obstruction flushly engages the rearward RIG engaging abutments of the auxiliary locking plates and with the RIG bar and its obstruction sliding over a shoulder of the locking plates, which prevents any further movement of the trailer away from the loading dock and any further downward rotation of the hook.

The stops 47 are positioned so that the abutment surfaces 76 of the plates 71 are pitched rearwardly at an angle of about three degrees from normal to the front surface 10 of the RIG bar 8 when the plates 71 in their set position 88b. Thus, the top end of the plates 71 first engage the obstruction 15 as best shown in FIG. 4C. Further forward movement of the trailer 5 overpowers the biasing springs 87 and causes the plates 71 to rotate forward about three degrees until the entire rearward surface of each plate abutment 76 engages the front surface 10 or 16 of the RIG bar 8 or obstruction 15 and each of the plate shoulders 77 rise up to engage the lower surface 9 or 18 of the RIG bar 8 or obstruction 15 as in FIG. 4D. The lower front corner 17 of the obstruction 15 is now in locked engagement 107 with the vertical plat surface 76 and horizontal plate shoulder 77. Although the plate engaging pin 65 of the hook 51 is in the channel 85, the slight three degree forward rotation of the plates 71 moves the pin 65 out of engagement with the plates 71. When in this locked engagement 107, the RIG bar 8 and obstruction 15 are captured by the hook 51 and locking plates 71 to prevent further forward movement of the trailer 5.

When the trailer is captured 107 by the hook 51 and auxiliary locking plates 71, the operation of lowering or retracting the hook 51 and plates 71 requires the trailer 5 to be backed up toward the dock wall 21 to release the locked engagement 107. When the RIG bar 8 and obstruction 15 are not directly over and pressing down on the plate shoulders 77, the locking plates 71 are once again biased by springs 87 to engage their stops 47 as in FIG. 4B. Then the motor 95 is engaged to drivingly rotate the hook 51 in a reverse direction down and away from the dock wall 21 and RIG bar 8. In a manner similar to the raising operation, at first just the hook 51 rotates. Then, when the plate engaging pin 65 of the hook 51 reengages plate arms 81, the hook 51 and plates 71 once again move in rotational unison until they reach their stored positions 101.

Operation of Vehicle Restraint with Auxiliary Locking Mechanism

Although the operation of the vehicle restraint 30 should be apparent from the above description, the following is provided to assist the reader in more readily understanding one possible method of operating this device. When a vehicle trailer is backed into the loading dock 20, the carriage 40 is in its upper biased position 48 with the hook and auxiliary locking mechanisms 50 and 70 stored 101 between the shear plates 41 of the carriage 40 as in FIG. 3A. When the RIG bar 8 is lower than the upper surfaces 43a, 44a of the carriage 40, the RIG bar impacts the ramped portion 43 of the carriage to vertically lower the carriage along track 32 until the RIG bar 8 slides onto its upper horizontal surface 44a. When the trailer is safely in the dock 20 with its RIG bar 8 engaging or sufficiently close to the dock wall 21 or bumpers 25, the control system is turned on to activate the gearmotor 95 through an operating cycle. The control system activates the gearmotor 95 to a high power mode for 5 seconds to rotate the hook 51 up and into engagement 104 with the RIG bar 8 or obstruction 15 as in FIG. 4A.

With the hook 51 raised and engaging 104 the RIG bar obstruction 15, the control system automatically turns the motor 95 to a low power mode to keep the hook in forced or torqued engagement with the RIG bar 8 during the process of loading and unloading the trailer. The gearmotor 95 and its direct coupling 98 with the hook 51 allow the hook to rotate back and forth to accommodate any rocking of the trailer during the loading and unloading process. The gearmotor 95 allows its drive shaft 96 to slip or rotate backwards without damaging the motor. Even after slipping, the gearmotor 95 continues to apply a constant torque to actively keep the hook 51 in forced engagement with the RIG bar 8 or obstruction. This constant torque helps prevent "dock-walk" 5b that can result in the hook inadvertently disengaging from the RIG bar.

When an obstruction 15 prevents the hook 51 from hooking around the upper corner 13 of the RIG bar 8, the gearmotor 95 may not be able to overcome the effects a driver inadvertently pulling away from the dock 20 or of trailer "dock-walk" 5b. The trailer 5 can move away from the dock wall 21 and the hook 51 can rotate down the RIG bar 8 or obstruction 15 so that the hook top 58 slides down the RIG bar 8 and obstruction 15 as in FIGS. 4B and 4C, until the auxiliary locking mechanism 70 engages the lower front corner 14 or 17 of the RIG bar 8 or obstruction 15 as in FIG. 4D. The hook 51 and auxiliary locking plates 71 (arms 75, abutments 76 and shoulders 77) then combine to capture the RIG bar 8 and obstruction 15 to prevent the inadvertent driver pulling away or excessive trailer "dock-walk" 5c and prevent the hook from "walking-off" or disengaging 5c the RIG bar 8. The RIG bar 8 and obstruction 15 remain captured by the restraint 30 so that the extended dock leverer lip (not shown) does not disengage from the rear 6 of the trailer bed 5a and the trailer 5 cannot inadvertently depart from the dock 20.

When the trailer loading and unloading process is complete, the control system is switched to turn the gearmotor 95 to a reverse high power mode. The reverse high power mode rotates and lowers the hook 51 back to its stored position 101. When the hook 51 reaches its stored position 101, it trips a sensor to turn off the motor and signal that the operating cycle is complete, and the trailer 5 is free to pull away from the loading dock 20.

While this invention is susceptible to embodiments in many different forms, the drawings show and the specification describes a preferred embodiment of the invention. It should be understood that the drawings and specification are to be considered an exemplification of the principles of the invention. They are not intended to limit the broad aspects of the invention to the embodiment illustrated. Various changes may be made and equivalents may be substituted without departing from the broader aspects of the invention.

I claim:

1. An impact trailer restraint for securing a trailer to a loading dock during the loading/unloading of the trailer, the loading dock having a front wall and the trailer having a RIG bar with front and bottom surfaces and an obstruction with front and bottom surfaces, where forward movement of the trailer away from the dock wall results in a forward movement of the RIG bar and obstruction, said trailer restraint comprising:

a track anchored proximal the front wall of the dock;

a carriage movably joined to said track, said carriage having an upper surface adapted to allow flush sliding engagement with the bottom surface of one of either the RIG bar and the obstruction when the trailer is in the loading dock, said carriage having a rotatable hooking mechanism and a rotatable auxiliary locking mechanism, said hooking mechanism being rotatably secured to said carriage about a motor driven axis of rotation and selectively rotatable between a retracted position and a range of raised positions, said hooking mechanism being adapted to engage one of either the RIG bar and the obstruction when in said raised positions, said auxiliary locking mechanism being rotatably secured to said carriage about a biased axis of rotation and biased by a biasing mechanism from a stored position to a raised set position, said biased axis of rotation being located forward said motor driven axis of rotation, said auxiliary locking mechanism being adapted to engagingly receive the front surface of one of either the RIG bar and the obstruction when in said set position;

a motor having a drive shaft drivingly connected to said hooking mechanism, and said motor being adapted to rotate said hooking mechanism in a first rotational direction during a deployment phase of operation and rotate said hooking mechanism in a second opposite rotational direction during a retraction phase of operation;

wherein said motor rotates said hooking mechanism in said first rotational direction to move said hooking mechanism from said retracted position to one of said raised positions to engage one of either the RIG bar and the obstruction prior to loading/unloading of the trailer, said auxiliary locking mechanism moving with said hooking mechanism as said auxiliary locking mechanism moves between said stored position and said set position; and, wherein the forward movement of the RIG bar results in a forward sliding movement of the bottom surface of one of either the RIG bar and the obstruction along said upper surface of said carriage, said forward sliding movement moving the front surface of one of either the RIG bar and the obstruction into abutting engagement with said auxiliary locking mechanism, said abutting engagement placing the RIG bar and said auxiliary locking mechanism into a locked position preventing further forward movement of the trailer during the loading/unloading of the trailer.

2. The impact trailer restraint of claim 1, and wherein said carriage includes first and second shear plates in space parallel registry, said hooking mechanism includes a hook rotatably secured to and between said shear plates and said auxiliary locking mechanism includes an auxiliary locking plate rotatably secured directly to said first shear plate between said first shear plate and said hook.

3. The impact trailer restraint of claim 2, and wherein said hook rotates in mated unison with said auxiliary locking plate as said auxiliary locking plate rotates between said stored position and said set position.

4. The impact trailer restraint of claim 3, and wherein said hook reaches an operationally lower raised position when said locking plate is at said set position, and said hook is rotatable to operationally higher raised positions to engage one of either the RIG bar and the obstruction, and wherein said hook disengages from said mated unison with said locking plate when said hook is raised between said operationally lower raised position and said operationally higher raised positions.

5. The impact trailer restraint of claim 4, and wherein said biasing mechanism holds said auxiliary locking plate in said set position when said hook moves between said operationally lower raised position and said operationally higher raised positions.

6. The impact trailer restraint of claim 5, and wherein said hook includes a plate engaging pin to engage said locking plate when said plate rotates from said set position to said stored position.

7. The impact trailer restraint of claim 6, and wherein said auxiliary locking plate has a base that engages a plate stop when said auxiliary locking plate is in said set position.

8. The impact trailer restraint of claim 7, and wherein said auxiliary locking plate has a RIG retaining arm and a plate retraction arm, said RIG retaining arm having an abutment surface and a shoulder, said shoulder being in slightly recessed alignment with said upper surfaces of said carriage when in said set position, and wherein the bottom surface of one of either the RIG bar and the obstruction engage and ride over said shoulder and engage and press into said abutment surface when in said locked position.

9. The impact trailer restraint of claim 8, and wherein said RIG retaining arm and said plate retraction arm form a channel, said plate engaging pin of said hook traveling inside said channel as said auxiliary locking plate rotates between said stored position and said set position, and wherein said plate engaging pin of said hook pressingly engages said plate retraction arm to overpower said biasing mechanism as said motor driven hook rotates said auxiliary locking plate from said set position to said stored position.

10. The impact trailer restraint of claim 9, and wherein said plate engaging pin of said hook disengages said inner plate surface of said retraction arm and moves out of said central channel when said hook rotates from said operational lower raised position toward said operational higher raised positions.

11. The impact trailer restraint of claim 10, and wherein said abutment surface of said auxiliary locking plate flushly engages the front surface of one of either the RIG bar and the obstruction when in said locked position, and said shoulder of said auxiliary locking plate rotates up to engage the bottom surface of one of either the RIG bar and the obstruction when in said locked position.

12. The impact trailer restraint of claim 11, and wherein said auxiliary locking mechanism includes first and second locking plates, said first locking plate being in parallel registry with said second locking plate, said locking plates sharing a common axis of rotation, said second locking plate being rotatably secured to said second shear plate between said second shear plate and said hook.

13. The impact trailer restraint of claim 12, and wherein said carriage has reinforcement plates formed into said shear plates, said reinforcement plates and shear plates have plate upper surfaces, and wherein said plate upper surfaces form said upper surface of said carriage and are coplanar to allow said sliding movement of the bottom surface of one of either the RIG bar and the obstruction along said plate upper surfaces and into said abutting engagement with said auxiliary locking plate.

14. The impact trailer restraint of claim 13, and wherein said hook has an elongated portion and a hooked portion with a top RIG engaging surface, and wherein said elongated portion is generally perpendicular to the front wall of the dock and said top RIG engaging surface of said hook is in generally flush engagement with the front surface of one of either the RIG bar and the obstruction when said auxiliary locking mechanism is in said locked position.

15. The impact trailer restraint of claim 5, and wherein said motor rotates said hooking mechanism in said second opposite rotational direction during said hook retracting phase to move said hooking mechanism and auxiliary locking mechanism to their said retracted and stored positions after loading/unloading of the trailer.

16. The impact trailer restraint of claim 15, and wherein said motor is a multi-mode electric motor operable at one of either a higher power level and a lower power level, said motor being adapted for continuous operation at said lower power level, and said motor continuously operating during the loading/unloading of the trailer to continuously apply torque to said drive shaft and maintain said hooking mechanism in forced engagement with one of either the RIG bar and the obstruction during loading/unloading of the trailer.

17. The impact trailer restraint of claim 16, and wherein said hooking mechanism rotates about a hook pin between said retracted and raised positions, and said drive shaft is directly connected to said hooking mechanism, and said drive shaft and hooking mechanism rotate together in unison.

18. The impact trailer restraint of claim 17, and wherein said vehicle restraint is an impact vehicle restraint, said electric motor is held by and travels with said carriage, said carriage has an upper surface and a sloped front surface and is movable between an upper position and a lower RIG bar engaging position, said carriage being biased toward said upper position.

19. The impact trailer restraint of claim 18, and further including a mounting plate having a spring housing with at least one spring, and wherein said at least one spring biases said carriage toward said upper position.

20. A trailer restraint to secure a trailer to a loading dock and prevent certain disengagement events, such as inadvertent driver departure and excessive dock-walk, the loading dock having a front wall and the trailer having a RIG bar with front and bottom surfaces and an obstruction with front and bottom surfaces, where forward movement of the trailer away from the dock wall results in a forward movement of the RIG bar and obstruction, said trailer restraint comprising:
   a carriage anchored proximal the front wall of the dock and movable to adjust to the height of the RIG bar, said carriage having an upper surface adapted to allow flush sliding engagement with the bottom surface of one of either the RIG bar and the obstruction when the trailer is in the loading dock;
   a hooking mechanism secured to said carriage and rotatable about a motor driven axis of rotation between a retracted position and a range of raised positions, said hooking mechanism having a retraction component;
   a motor having a drive shaft drivingly connected to said hooking mechanism, said motor being adapted to rotate said hooking mechanism in a first rotational direction during a deployment phase of operation, maintain said hooking mechanism in said range of raised positions during a RIG holding phase of operation except for the certain disengagement events, and rotate said hooking mechanism in a second opposite rotational direction during a retraction phase of operation;

an auxiliary securing mechanism secured to said carriage and rotatable about a biased axis of rotation between a lower stored position and a raised set position, said biased axis of rotation being forward said motor driven axis of rotation, said securing mechanism having first and second RIG abutments and a retraction surface, said retraction component pressing down on said retraction surface to hold said securing mechanism in said lower stored position, and said first RIG abutment facing rearwardly to selectively engage the front surface of one of either the RIG bar and the obstruction when said securing mechanism is in said raised set position;

a biasing mechanism within said carriage engaging said securing mechanism and adapted to rotate said securing mechanism from said lower stored position to said raised set position;

wherein during said deployment phase of operation, said hooking mechanism rotates from said retracted position to said range of raised positions to engage one of either the RIG bar and the obstruction, said biasing mechanism rotates said securing mechanism to and holds said securing mechanism at said raised set position, and said retraction component disengages said retraction surface;

wherein during said RIG holding phase of operation for the certain disengagement events, the forward movement of the RIG bar moves the front surface of one of either the RIG bar and the obstruction into abutting engagement with said first RIG abutment and moves the bottom surface of one of either the RIG bar and the obstruction over said second RIG abutment, said hooking and securing mechanisms combining to capture the RIG bar and prevent further forward movement of the RIG bar and trailer; and, wherein during said retraction phase of operation, said hooking mechanism rotates from said range of raised positions to said retracted position with said retraction component engaging said retraction surface to overpower said biasing mechanism and rotate said securing mechanism from said raised set position to said lower stored position.

21. The trailer restraint of claim 20, and wherein during said deployment phase of operation said securing mechanism rotates in a first direction, and wherein during the RIG holding phase of operation for the disengagement events, said securing mechanism rotates in an opposite direction into a locked position with said second RIG abutment engaging the bottom surface of one of either the RIG bar and the obstruction.

22. The trailer restraint of claim 21, and wherein said carriage has a stop, and wherein during said deployment phase of operation said biasing mechanism biasingly holds said securing mechanism against said stop in said set position, and wherein during the RIG holding phase of operation for the certain disengagement events said securing mechanism rotates away from said stop and into said locked position.

23. The trailer restraint of claim 20, and wherein said carriage includes first and second shear plates in space parallel registry, said hooking mechanism includes a hook rotatably secured to and between said shear plates, and said auxiliary securing mechanism includes first and second RIG securing plates, each RIG securing plate having said first and second RIG abutments and said retraction surface, said first RIG securing plate being rotatably secured to said first shear plate between said first shear plate and said hook, said second RIG securing plate being rotatably secured to said second shear plate between said second shear plate and said hook, and said RIG securing plates being in parallel registry and having a common axis of rotation.

24. The trailer restraint of claim 23, and wherein said retraction surface of each said RIG securing plate is formed by a channel in each of said RIG securing plates, said hook has opposed side surfaces, said retraction component extends from said opposed side surfaces, and wherein said retraction component engages said retraction surfaces of said RIG securing plates when traveling in said channels and disengages said retraction surfaces of said RIG securing plates when traveling out of said channels.

25. The trailer restraint of claim 24, and wherein said retraction component is a retraction pin extending through said hook, and said biasing mechanism is a coil spring that independently rotates said securing plate to said set position.

26. The trailer restraint of claim 22, and wherein the RIG bar and obstruction each have a lower front corner, said first RIG abutment is a first RIG abutment surface, said second RIG abutment is a shoulder abutment surface extending substantially normal to said first RIG abutment surface, and said abutment surfaces engage the lower front corner of one of either the RIG bar and the obstruction.

27. The trailer restraint of claim 20, and wherein during said RIG holding phase of operation, without the certain disengagement events, said securing mechanism remains in its said set position without said RIG bar sliding over said second RIG abutment, and wherein prior to said retraction phase of operation the trailer need not back up toward the loading dock to disengage said securing mechanism.

28. The trailer restraint of claim 20, and wherein said trailer restraint is an impact trailer restraint and said carriage has a ramped front end with an upper surface, and when said securing mechanism is in said lower stored position, said securing mechanism is below said upper surface of said ramped front end and said first RIG abutment faces forwardly.

29. The trailer restraint of claim 20, and wherein said biasing mechanism rotates said auxiliary securing mechanism at a faster rate of rotation than said motor rotates said hooking mechanism.

\* \* \* \* \*